US006841139B2

(12) United States Patent
Margrave et al.

(10) Patent No.: US 6,841,139 B2
(45) Date of Patent: *Jan. 11, 2005

(54) METHODS OF CHEMICALLY DERIVATIZING SINGLE-WALL CARBON NANOTUBES

(75) Inventors: John L. Margrave, Bellaire, TX (US); Edward T. Mickelson, Pearland, TX (US); Robert Hauge, Houston, TX (US); Peter Boul, Houston, TX (US); Chad Huffman, Houston, TX (US); Jie Liu, Chapel Hill, NC (US); Richard E. Smalley, Houston, TX (US); Ken Smith, Spring, TX (US); Daniel T. Colbert, Houston, TX (US)

(73) Assignee: William Marsh Rice University, Houston, TX (US)

( * ) Notice: Subject to any disclaimer, the term of this patent is extended or adjusted under 35 U.S.C. 154(b) by 539 days.

This patent is subject to a terminal disclaimer.

(21) Appl. No.: 09/810,390

(22) Filed: Mar. 16, 2001

(65) Prior Publication Data

US 2002/0004028 A1 Jan. 10, 2002

Related U.S. Application Data

(62) Division of application No. 09/787,473, filed as application No. PCT/US99/21366 on Sep. 17, 1999.
(60) Provisional application No. 60/138,505, filed on Jun. 10, 1999, provisional application No. 60/101,092, filed on Sep. 18, 1998, and provisional application No. 60/106,918, filed on Nov. 3, 1998.

(51) Int. Cl.$^7$ .................................................. D01F 9/12
(52) U.S. Cl. ..................................... 423/447.1; 423/460
(58) Field of Search ............................... 423/447.1, 460

(56) References Cited

U.S. PATENT DOCUMENTS

| 5,300,203 | A | | 4/1994 | Smalley |
| 5,346,683 | A | | 9/1994 | Green et al. |
| 5,424,054 | A | | 6/1995 | Bethune et al. |
| 5,698,175 | A | | 12/1997 | Hiura et al. |
| 6,331,262 | B1 | * | 12/2001 | Haddon et al. ............. 423/460 |

FOREIGN PATENT DOCUMENTS

| JP | 08/325008 | | 12/1996 |
| WO | WO 96/18059 | | 6/1996 |
| WO | WO 97/32571 | A1 | 9/1997 |
| WO | WO 00/73205 | A1 | 12/2000 |

OTHER PUBLICATIONS

Iijima, Sumio and Ichihashi, Toshinari, "Single–shell carbon nanotubes of 1–nm diameter," *Nature*, vol. 363, pp. 603–605, Jun. 17, 1993.

Li, W.Z., et al., "Large–Scale Synthesis of Aligned Carbon Nanotubes," *Science*, vol. 274, pp. 1701–1703, Dec. 6, 1996.

Ugarte, D., et al., "Nanocapillarity and Chemistry in Carbon Nanotubes," *Science*, vol. 274, pp. 1897–1899, Dec. 13, 1996.

Rao, A.M., et al., "Diameter–Selective Raman Scattering from Vibrational Modes in Carbon Nanotubes," *Science*, vol. 275, pp. 187–190, Jan. 10, 1997.

Charlier, Jean–Christopher, et al., "Microscopic Growth Mechanisms for Carbon Nanotubes," *Science*, vol. 275, pp. 646649, Jan. 31, 1997.

Thess, Andreas, et al., Crystalline Ropes of Metallic Carbon Nanotubes, *Science*, vol. 273, pp. 483–487.

Hamada, Noriaki, et al., "New One–Dimensional Conductors: Graphitic Microtubules," *The American Physical Society*, vol. 68, No. 10, pp. 1579–1581, Mar. 9, 1992.

Guo, Ting, et al., "Self–Assembly of Tubular Fullerenes," *J. Phys. Chem. 1995*, vol. 99, No. 27, pp. 10694–10697.

Guo, T., et al., "Catalytic growth of single–walled nanotubes by laser vaporization," *Chemical Physics Letters*, vol. 243, pp. 49–54, 1995.

Rinzler, A.G., "Unraveling Nanotubes: Field Emission from an Atomic Wire," *Science*, vol. 269, pp. 1550–1553, Sep. 15, 1995.

(List continued on next page.)

*Primary Examiner*—Stuart L. Hendrickson
(74) *Attorney, Agent, or Firm*—Ross Spencer Garsson; Robert C. Shaddox; Winstead Sechrest & Minick P.C.

(57) ABSTRACT

This invention is directed to making chemical derivatives of carbon nanotubes and to uses for the derivatized nanotubes, including making arrays as a basis for synthesis of carbon fibers. In one embodiment, this invention also provides a method for preparing single wall carbon nanotubes having substituents attached to the side wall of the nanotube by reacting single wall carbon nanotubes with fluorine gas and recovering fluorine derivatized carbon nanotubes, then reacting fluorine derivatized carbon nanotubes with a nucleophile. Some of the fluorine substituents are replaced by nucleophilic substitution. If desired, the remaining fluorine can be completely or partially eliminated to produce single wall carbon nanotubes having substituents attached to the side wall of the nanotube. The substituents will, of course, be dependent on the nucleophile, and preferred nucleophiles include alkyl lithium species such as methyl lithium. Alternatively, fluorine may be fully or partially removed from fluorine derivatized carbon nanotubes by reacting the fluorine derivatized carbon nanotubes with various amounts of hydrazine, substituted hydrazine or alkyl amine. The present invention also provides seed materials for growth of single wall carbon nanotubes comprising a plurality of single wall carbon nanotubes or short tubular molecules having a catalyst precursor moiety covalently bound or physisorbed on the outer surface of the sidewall to provide the optimum metal cluster size under conditions that result in migration of the metal moiety to the tube end.

49 Claims, 27 Drawing Sheets

OTHER PUBLICATIONS

Guo, T. and Smalley, Richard E., "Production of Single–Walled Carbon Nanotubes Via Laser," *Electrochemical Society Proceedings*, vol. 95, No. 10, pp. 636–647.

Thess, Andreas, "Crystalline Ropes of Metallic Carbon Nanotubes," *Science*, vol. 273, pp. 483–487, Jul. 26, 1996.

Ge, Maohui and Sattler, Klaus, "Scanning tunneling microscopy of single–shell nanotubes of carbon," *320 Applied Physics Letters 65*, No. 18, Oct. 31, 1994, Woodbury, NY.

Dai, Hongjie, et al., "Single–wall nanotubes produced by metal–catalyzed disproportionation of carbon monoxide," *Chemical Physics Letters 260*, pp. 364–371, 1994.

Lambert, J.M., et al., "Improving conditions towards isolating single–shell carbon nanotubes," *Chemical Physics Letters 226*, pp. 364–371, 1994.

Zhou, Dan, et al., "Single–walled carbon nanotubes growing radially from YC2 particles," *320 Applied Physics Letters*, vol. 65, No. 12, Sep. 19, 1994, Woodbury, NY, U.S.

Wang, X.K., et al., "Stabale glow discharge for synthesis of carbon nanotubes," *Applied Physics Letters*, vol. 66, No. 4, Jan. 23, 1995, Woodbury, NY, U.S.

Nikolaev, Pavel, et al., "Diameter Doubling of Single–Wall Nanotubes," *Chemical Physics Letters*, Oct. 24, 1996.

"Fullerene Crop Circles," *Nature*, vol. 385, pp. 780–781, Feb. 27, 1997.

Guo, Ting, et al., "Uranium Stabilization of $C_{28}$: A Tetravalent Fullerene," *Science*, submitted May 4, 1992.

"A New Type of Solar Cell Based on Sensitized, Nanocrystalline Semiconducting Oxide Films," http://dcwww.epfl.ch/icp/ICP–2/solarcell_E.html.

"Transmission–Line Design Considerations," *Transmission– Line Parameters*, Ch. 5, Sec. 5.1, pp. 135–139.

Hamwi et al., "Fluorination of carbon nanotubes," *Carbon, GB, Pergamon Press*, Oxford, vol. 35, no. 6, 1997, pp. 723–728.

Mickelson et al., "Fluorination of single–wall carbon nanotubes," *Chemical Physics Letters*, vol. 296, 1998, pp. 188–194.

Haddon et al, "Solution Properties of Single–Walled Carbon Nanotubes," *Science*, vol. 282, Oct. 2, 1998, pp. 95–98.

Rao et al., "Functionalised carbon nanotubes from solutions," *Chem. Commun.*, 1996, pp. 1525–1526.

USSN 60/102,909, Entitled "Method of Dissolving Single–Walled Carbon Nanotubes in Organic Solutons", Filed Oct. 2, 1998.

USSN 60/102,787, Entitled "Solubility Properties of Single– Walled Carbon Nanotubes", Filed Oct. 2, 1998.

\* cited by examiner

METHODS OF CHEMICALLY DERIVATIZING SINGLE-WALL CARBON NANOTUBES

PRIORITY BENEFIT AND CROSS REFERENCE TO RELATED APPLICATIONS

This Application is a divisional application of U. S. patent application Ser. No. 09/787,473"CHEMICAL DERIVATIZATION OF SINGLE-WALL CARBON NANOTUBES TO FACILITATE SOLVATION THEREOF; ANT) USE OF DERIVATIZED NANOTUBES TO FORM CATALYST-CONTAINING SEED MATERIALS FOR USE IN MAKING CARBON FIBERS" to Margraves et al., (Attorney Docket No. 11321-PO13WOUS), filed concurrent to the date of this Application. This application claims priority benefits to U.S. patent application Ser. No. 09/787,473 (Attorney Docket No. 11321-PO13WOUS), and claims priority benefits to International Application No. PCT/US 99/21366, filed Sep. 17, 1999, which application claims priority benefits to U.S. patent application Nos. (1) 60/101,092, filed Sep. 18, 1998; (2) 60/106,918 filed Nov. 3, 1998; and (3) 60/138,505, filed Jun. 10, 1999, all of which are hereby incorporated by reference.

The present invention is related to the following corresponding U.S. patent applications, all of which are divisionals of the U.S. patent application Ser. No. 09/787,473 (Attorney Docket No. 11321-PO13US):

Ser. No. 09/809,885 "CHEMICAL DERIVATIZATION OF SINGLE-WALL CARBON NANOTUBES TO FACILITATE SOLVATION THEREOF; AND USE OF DERIVATIZED NANOTUBES TO FORM CATALYST-CONTAINING SEED MATERIALS FOR USE IN MAKING CARBON FIBERS" to Margraves et al., (Attorney Docket No. 11321-P026US), filed concurrent to the date of this Application;

Ser. No. 09/809,865 "CHEMICAL DERIVATIZATION OF SINGLE-WALL CARBON NANOTUBES TO FACILITATE SOLVATION THEREOF; AND USE OF DERIVATIZED NANOTUBES TO FORM CATALYST-CONTAINING SEED MATERIALS FOR USE IN MAKING CARBON FIBERS" to Margraves et al., (Attorney Docket No. 11321-P027US), filed concurrent to the date of this Application;

Ser. No. 09/810,150 "CHEMICAL DERIVATIZATION OF SINGLE-WALL CARBON NANOTUBES TO FACILITATE SOLVATION THEREOF; AND USE OF DERIVATIZED NANOTUBES TO FORM CATALYST-CONTAINING SEED MATERIALS FOR USE IN MAKING CARBON FIBERS" to Margraves et al., (Attorney Docket No. 11321-P028US), filed concurrent to the date of this Application; and Ser. No. 09/810,201 "CHEMICAL DERIVATIZATION OF SINGLE-WALL CARBON NANOTUBES TO FACILITATE SOLVATION THEREOF; AND USE OF DERIVATIZED NANOTUBES TO FORM CATALYST-CONTAINING SEED MATERIALS FOR USE IN MAKING CARBON FIBERS" to Margraves et al., (Attorney Docket No. 11321-P029US), filed concurrent to the date of this Application.

BACKGROUND OF THE INVENTION

1. Field of the Invention

This invention is directed to making chemical derivatives of carbon nanotubes and to uses for the derivatized nanotubes, including making arrays as a basis for synthesis of carbon fibers.

2. Related Art

Fullerenes are closed-cage molecules composed entirely of $sp^2$-hybridized carbons, arranged in hexagons and pentagons. Fullerenes ($C_{60}$) were first identified as closed spheroidal cages produced by condensation from vaporized carbon.

Fullerene tubes are produced in carbon deposits on the cathode in carbon arc methods of producing spheroidal fullerenes from vaporized carbon. Ebbesen et al. (Ebbesen I), "Large-Scale Synthesis Of Carbon Nanotubes," *Nature*, Vol. 358, p. 220 (Jul. 16, 1992) and Ebbesen et al., (Ebbesen II), "Carbon Nanotubes," *Annual Review of Materials Science*, Vol. 24, p. 235 (1994). Such tubes are referred to herein as carbon nanotubes. Many of the carbon nanotubes made by these processes were multi-wall nanotubes, i.e., the carbon nanotubes resembled concentric cylinders. Carbon nanotubes having up to seven walls have been described in the prior art. Ebbesen II; Iijima et al., "Helical Microtubules Of Graphitic Carbon," *Nature*, Vol. 354, p. 56 (Nov. 7, 1991).

Production of Single-wall Nanotubes

Single-wall carbon nanotubes (SWNT) have been made in a DC arc discharge apparatus of the type used in fullerene production by simultaneously evaporating carbon and a small percentage of VIII B transition metal from the anode of the arc discharge apparatus. See Iijima et al., "Single-Shell Carbon Nanotubes of 1 nm Diameter," *Nature*, Vol. 363, p. 603 (1993); Bethune et al., "Cobalt Catalyzed Growth of Carbon Nanotubes with Single Atomic Layer Walls," *Nature*, Vol. 63, p. 605 (1993); Ajayan et al., "Growth Morphologies During Cobalt Catalyzed Single-Shell Carbon Nanotube Synthesis," *Chem. Phys. Lett.*, Vol. 215, p. 509 (1993); Zhou et al., "Single-Walled Carbon Nanotubes Growing Radially From $YC_2$ Particles," *Appl. Phys. Lett.*, Vol. 65, p. 1593 (1994); Seraphin et al., "Single-Walled Tubes and Encapsulation of Nanocrystals Into Carbon Clusters," *Electrochem. Soc.*, Vol. 142, p. 290 (1995); Saito et al., "Carbon Nanocapsules Encaging Metals and Carbides," *J. Phys. Chem. Solids*, Vol. 54, p. 1849 (1993); Saito et al., "Extrusion of Single-Wall Carbon Nanotubes Via Formation of Small Particles Condensed Near an Evaporation Source," *Chem. Phys. Lett.*, Vol. 236, p. 419 (1995). It is also known that the use of mixtures of such transition metals can significantly enhance the yield of single-wall carbon nanotubes in the arc discharge apparatus. See Lambert et al., "Improving Conditions Toward Isolating Single-Shell Carbon Nanotubes," *Chem. Phys. Lett.*, Vol. 226, p. 364 (1994). While the arc discharge process can produce single-wall nanotubes, the yield of nanotubes is low and the tubes exhibit significant variations in structure and size between individual tubes in the mixture. Individual carbon nanotubes are difficult to separate from the other reaction products and purify.

An improved method of producing single-wall nanotubes is described in U.S. Ser. No. 08/687,665, entitled "Ropes of Single-Walled Carbon Nanotubes" incorporated herein by reference in its entirety. This method uses, inter alia, laser vaporization of a graphite substrate doped with transition metal atoms, preferably nickel, cobalt, or a mixture thereof, to produce single-wall carbon nanotubes in yields of at least 50% of the condensed carbon. The single-wall nanotubes produced by this method tend to be formed in clusters, termed "ropes," of 10 to 1000 single-wall carbon nanotubes in parallel alignment, held together by van der Waals forces in a closely packed triangular lattice. Nanotubes produced by this method vary in structure, although one structure tends to predominate.

A method of producing carbon fibers from single-wall carbon nanotubes is described in PCT Patent Application No. PCT/US98/04513, incorporated herein by reference in its entirety. The carbon fibers are produced using SWNT molecules in a substantially two-dimensional array made up of single-walled nanotubes aggregated (e.g., by van der Waals forces) in substantially parallel orientation to form a monolayer extending in directions substantially perpendicular to the orientation of the individual nanotubes. In this process the seed array tubes are opened at the top (free) end and a catalyst cluster is deposited at this free end. A gaseous carbon source is then provided to grow the nanotube assembly into a fiber. In various processes involving metal cluster catalysis, it is important to provide the proper number of metal atoms to give the optimum size cluster for single wall nanotube formation.

Derivatization of Single-wall Nanotubes

Since the discovery of single wall carbon nanotubes (SWNTs) in 1993 (Iijima, S. and Ichihashi, T., *Nature* 1993,363:603–605), researchers have been searching for ways to manipulate them chemically. While there have been many reports and review articles on the production and physical properties of carbon nanotubes, reports on chemical manipulation of nanotubes have been slow to emerge. There have been reports of functionalizing nanotube ends with carboxylic groups (Rao, et al., *Chem. Commun.*, 1996, 1525–1526; Wong, et al., *Nature*, 1998,394:52–55), and then further manipulation to tether them to gold particles via thiol linkages (Liu, et al., *Science*, 1998, 280:1253–1256). Haddon and co-workers (Chen, et al., *Science*, 1998, 282:95–98) have reported solvating SWNTs by adding octadecylamine groups on the ends of the tubes and then adding dichlorocarbenes to the nanotube side wall, albeit in relatively low quantities (~2%). While theoretical results have suggested that functionalization of the nanotube side-wall is possible (Cahill, et al., *Tetrahedron*, 1996, 52 (14):5247–5256), experimental evidence confirming this theory has not been obtained.

SUMMARY OF THE INVENTION

Accordingly, it is an object of this invention to provide a method for derivatizing carbon nanotubes, especially the side walls of single-wall carbon nanotubes.

It is another object of this invention to provide a high yield, single step method for producing large quantities of continuous macroscopic carbon fiber from single-wall carbon nanotubes using inexpensive carbon feedstocks at moderate temperatures.

It is yet another object of this invention to provide macroscopic carbon fiber made by such a method. These and other objects of this invention are met by one or more of the following embodiments.

This invention provides single wall carbon nanotubes and/or tubular carbon molecules derivatized with substituents covalently bonded to carbon atoms of the side wall of the nanotube or molecule. The substituents may in principle be attached on the interior and/or exterior of the nanotube side wall, but the attachment will not be predominantly on the exterior wall. In particular, the single wall carbon nanotubes may have substituents selected from fluorine, alkyl and phenyl attached to the side wall. Such single wall carbon nanotubes having fluorine covalently bonded to the side wall of the nanotube demonstrate high electrical resistance.

This invention also provides a method for derivatizing carbon nanotubes comprising reacting carbon nanotubes with fluorine gas, the fluorine gas preferably being free of $F_2$. Where the carbon nanotubes are single wall nanotubes, and the temperature is at least 500° C., the product may be multiple wall carbon nanotubes derivatized with fluorine. Where the carbon nanotubes are single wall nanotubes, and the temperature is between 250° C. and 500° C., the product is single wall carbon nanotubes having fluorine covalently bonded to carbon atoms of the side wall of the nanotube.

In one embodiment, this invention also provides a method for preparing single wall carbon nanotubes having substituents attached to the side wall of the nanotube by reacting single wall carbon nanotubes with fluorine gas and recovering fluorine derivatized carbon nanotubes, then reacting fluorine derivatized carbon nanotubes with a nucleophile. Some of the fluorine substituents are replaced by nucleophilic substitution. If desired, the remaining fluorine can be completely or partially eliminated to produce single wall carbon nanotubes having substituents attached to the side wall of the nanotube. The substituents will, of course, be dependent on the nucleophile, and preferred nucleophiles include alkyl lithium species such as methyl lithium. Alternatively, fluorine may be fully or partially removed from fluorine derivatized carbon nanotubes by reacting the fluorine derivatized carbon nanotubes with various amounts of hydrazine, substituted hydrazine or alkyl amine.

This invention also provides a process for preparing a suspension or solution of single wall carbon nanotubes in various solvents from which individual single wall carbon nanotubes may be isolated, the process comprising providing a mass of single wall carbon nanotubes that include bundles of fibers held in close association by van der Waals forces, derivatizing the side walls of the single wall carbon nanotubes with a plurality of chemical moieties distributed substantially uniformly along the length of said single wall carbon nanotube side walls, said chemical moieties having chemical and steric properties sufficient to prevent the reassembly of van der Waals force bound bundles, producing true solutions and recovering the individual, derivatized single wall carbon nanotubes from said solution or suspension. Preferably, the attached chemical moieties are fluorine to provide solution in various alcohols, preferably isopropyl alcohol, and various R-groups to appropriate to provide solubility in other solvents including $CHCl_3$, Dimethylformamide, etc.

In another embodiment, a method for forming a macroscopic molecular array of tubular carbon molecules is disclosed. This method includes the steps of providing at least about $10^6$ tubular carbon molecules of substantially similar length in the range of 50 to 500 nm; introducing a linking moiety onto at least one end of the tubular carbon molecules; providing a substrate coated with a material to which the linking moiety will attach; and contacting the tubular carbon molecules containing a linking moiety with the substrate.

The present invention also provides seed materials for growth of single wall carbon nanotubes comprising a plurality of single wall carbon nanotubes or short tubular molecules having a catalyst precursor moiety covalently bound or physisorbed on the outer surface of the sidewall to provide the optimum metal cluster size under conditions that result in migration of the metal moiety to the tube end.

This invention also provides a seed array for the catalytic production of assemblies of single wall carbon nanotubes comprising a plurality of relatively short single wall carbon nanotubes assembled in a generally parallel configuration, and disposed on the side wall of each said single wall carbon nanotube a sufficient quantity of physisorbed or covalently bonded transition metal catalyst precursor moieties to provide active catalyst metal atom clusters of the proper size to grow single wall carbon nanotubes under conditions that promote the generation of metal atoms and the migration of said metal atoms to the free ends of said single wall carbon nanotubes.

In another embodiment, a method for continuously growing a macroscopic carbon fiber comprising at least about $10^6$ single-wall nanotubes in generally parallel orientation is disclosed. In this method, a macroscopic molecular array of at least about $10^6$ tubular carbon molecules in generally parallel orientation is provided. The array is processed to provide a single plane of open-ended nanotubes at an angle generally perpendicular to the axes of parallel tubes in the array. The open ends of the tubular carbon molecules in the array are then contacted with a catalytic metal by causing migration of metal atoms released from side wall attached catalyst precursor groups. A gaseous source of carbon is supplied to the end of the array while localized energy is applied to the end of the array in order to heat the end to a temperature in the range of about 500° C. to about 1300° C. The growing carbon fiber is continuously recovered.

In another embodiment, an apparatus for forming a continuous macroscopic carbon fiber from a macroscopic molecular template array similar to that described above, comprising at least about $10^6$ single-wall carbon nanotubes having a catalytic metal deposited on the open ends of said nanotubes is disclosed. This apparatus includes a means for locally heating only the open ends of the nanotubes in the template array in a growth and annealing zone to a temperature in the range of about 500° C. to about 1300° C. It also includes a means for supplying a carbon-containing feedstock gas to the growth and annealing zone immediately adjacent the heated open ends of the nanotubes in the template array. It also includes a means for continuously removing growing carbon fiber from the growth and annealing zone while maintaining the growing open end of the fiber in the growth and annealing zone.

The foregoing objectives, and others apparent to those skilled in the art, are achieved according to the present invention as described and claimed herein, and in the text of U.S. provisional application No. 60/106,918, filed Nov. 3, 1998, which is incorporated herein in its entirety.

DETAILED DESCRIPTION OF PREFERRED EMBODIMENTS

Figure 1A:
FIG. 1. A) TEM image of pure, unreacted SWNT B) TEM of SWNT after being fluorinated at 325° C. C) TEM of SWNT after being fluorinated at 500° C. D) another TEM of SWNT fluorinated at 500° C. showing the formation of MWNT.
Figure 1B:
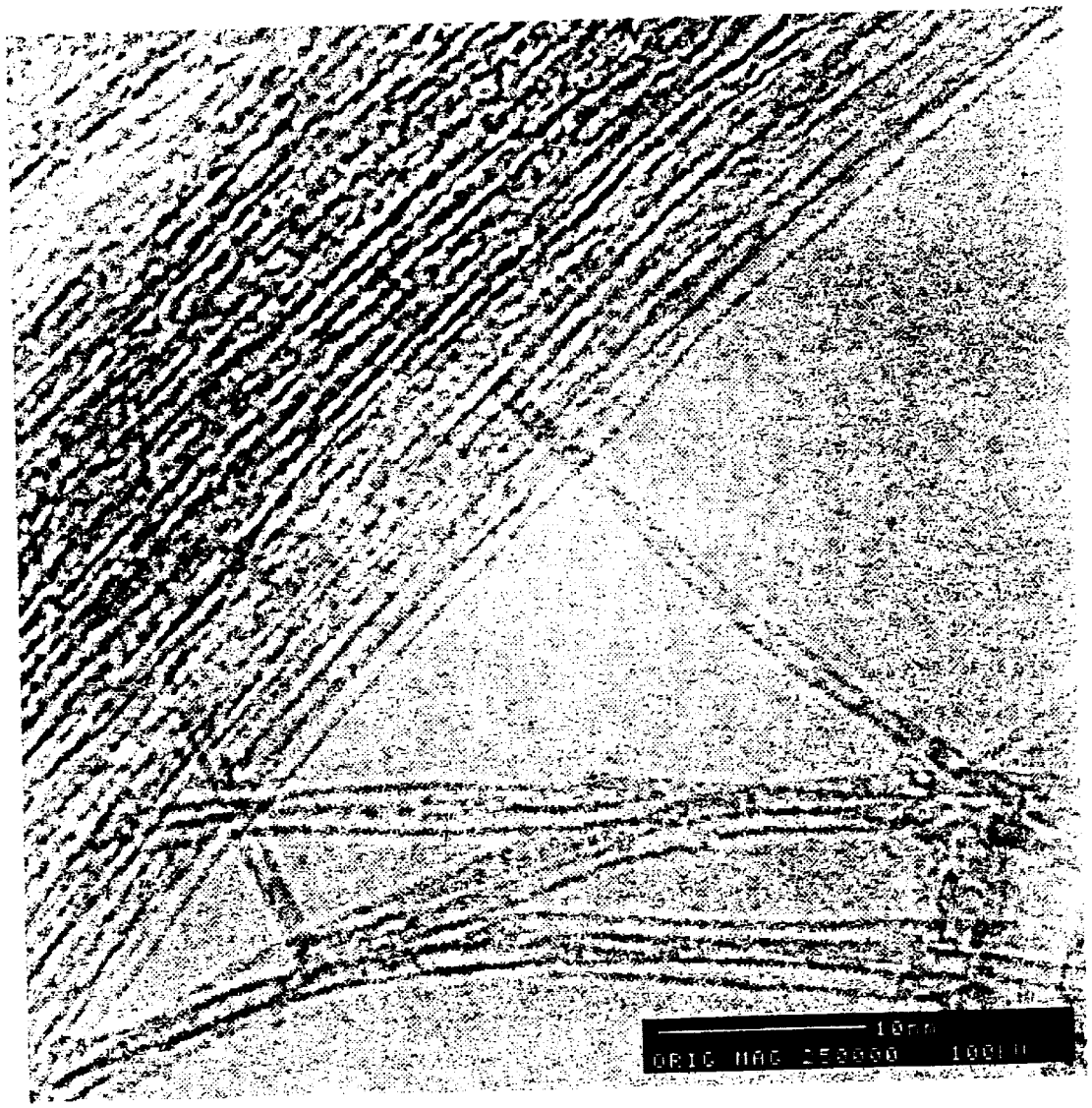
Figure 1C:
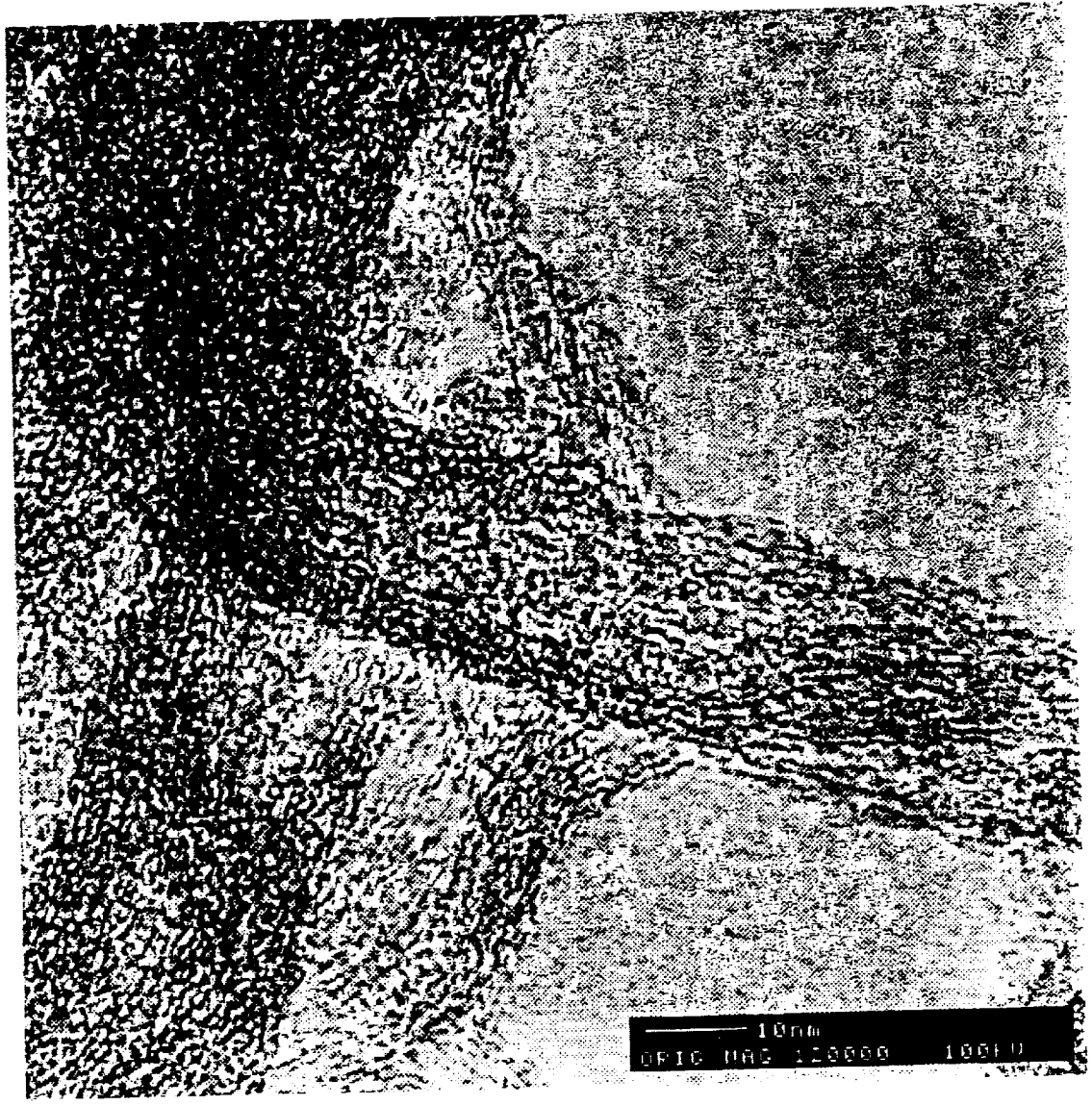
Figure 1D:

Carbon has from its very essence not only the propensity to self-assemble from a high temperature vapor to form perfect spheroidal closed cages (of which $C_{60}$ is prototypical), but also (with the aid of a transition metal catalyst) to assemble into perfect single-wall cylindrical tubes which may be sealed perfectly at both ends with a semifullerene dome. These tubes, which may be thought of as one-dimensional single crystals of carbon, are true fullerene molecules.

Single-wall carbon nanotubes are much more likely to be free of defects than multi-wall carbon nanotubes. Defects in single-wall carbon nanotubes are less likely than defects in multi-walled carbon nanotubes because the latter have neighboring walls that provide for easily-formed defect sites via bridges between unsaturated carbon valances in adjacent tube walls. Since single-wall carbon nanotubes have fewer defects, they are stronger, more conductive, and therefore more useful than multi-wall carbon nanotubes of similar diameter.

Carbon nanotubes, and in particular the single-wall carbon nanotubes, are useful for making electrical connectors in micro devices such as integrated circuits or in semiconductor chips used in computers because of the electrical conductivity and small size of the carbon nanotube. The carbon nanotubes are useful as antennas at optical frequencies, and as probes for scanning probe microscopy such as are used in scanning tunneling microscopes (STM) and atomic force microscopes (AFM). The carbon nanotubes may be used in place of or in conjunction with carbon black in tires for motor vehicles. The carbon nanotubes are also useful as supports for catalysts used in industrial and chemical processes such as hydrogenation, reforming and cracking catalysts.

Ropes of single-wall carbon nanotubes will conduct electrical charges with a relatively low resistance. Ropes are useful in any application where an electrical conductor is needed, for example as an additive in electrically conductive paints or in polymer coatings or as the probing tip of an STM.

In defining carbon nanotubes, it is helpful to use a recognized system of nomenclature. In this application, the carbon nanotube nomenclature described by M. S. Dresselhaus, G. Dresselhaus, and P. C. Eklund, *Science of Fullerness and Carbon Nanotubes*, Chap. 19, especially pp. 756–760, (1996), published by Academic Press, 525 B Street, Suite 1900, San Diego, Calif. 92101-4495 or 6277 Sea Harbor Drive, Orlando, Fla. 32877 (ISBN 0-12-221820-5), which is hereby incorporated by reference, will be used. The single wall tubular fullerenes are distinguished from each other by double index (n,m) where n and m are integers that describe how to cut a single strip of hexagonal "chicken-wire" graphite so that it makes the tube perfectly when it is wrapped onto the surface of a cylinder and the edges are sealed together. When the two indices are the same, m=n, the resultant tube is said to be of the "arm-chair" (or n,n) type, since when the tube is cut perpendicular to the tube axis, only the sides of the hexagons are exposed and their pattern around the periphery of the tube edge resembles the arm and seat of an arm chair repeated n times. Arm-chair tubes are a preferred form of single-wall carbon nanotubes since they are metallic, and have extremely high electrical and thermal conductivity. In addition, all single-wall nanotubes have extremely high tensile strength.

Carbon nanotubes may have diameters ranging from about 0.6 nanometers (nm) for a single-wall carbon nanotube up to 3 nm, 5 nm, 10 nm, 30 nm, 60 nm or 100 nm for single-wall or multi-wall carbon nanotubes. The carbon nanotubes may range in length from 50 nm up to 1 millimeter (mm), 1 centimeter (cm), 3 cm, 5 cm, or greater. The yield of single-wall carbon nanotubes in the product made by this invention is unusually high.

Catalytic Formation of Carbon Nanotubes

As will be described further, one or more transition metals of Group VIB chromium (Cr), molybdenum (Mo), tungsten (W) or Group VM B transition metals, e.g., iron (Fe), cobalt (Co), nickel (Ni), ruthenium (Ru), rhodium (Rh), palladium (Pd), osmium (Os), iridium (Ir) and platinum (Pt) catalyze the growth of a carbon nanotube and/or ropes when contacted with a carbon bearing gas such carbon monoxide and hydrocarbons, including aromatic hydrocarbons, e.g., benzene, toluene, xylene, cumene, ethylbenzene, naphthalene, phenanthrene, anthracene or mixtures thereof, non-aromic hydrocarbons, e.g., methane, ethane, propane, ethylene, propylene, acetylene or mixtures thereof, and oxygen-containing hydrocarbons, e.g., formaldehyde, acetaldehyde, acetone, methanol, ethanol or mixtures thereof. Mixtures of one or more Group VIB or VIIIB transition metals also selectively produce single-wall carbon nanotubes and ropes of single-wall carbon nanotubes in higher yields. The mechanism by which the growth in the carbon nanotube and/or rope is accomplished is not completely understood. However, it appears that the presence of the one or more Group VI B or VIII B transition metals on the end of the carbon nanotube facilitates the addition of carbon from the carbon vapor to the solid structure that forms the carbon nanotube. Applicants believe this mechanism is responsible for the high yield and selectivity of single-wall carbon nanotubes and/or ropes in the product and will describe the invention utilizing this mechanism as merely an explanation of the results of the invention. Even if the mechanism is proved partially or wholly incorrect, the invention which achieves these results is still fully described herein.

One aspect of the invention comprises a method of making carbon nanotubes and/or ropes of carbon nanotubes which comprises supplying carbon vapor to the live end of one or more of a carbon nanotubes growing by a catalytic process in which there is a "live end" of the nanotube in contact with a nanometer-scale transition metal particle that serves as a catalyst. The live end of the nanotube is maintained in contact with a carbon bearing feedstock gas in an annealing zone at an elevated temperature. In one process of this type carbon in vapor form may be supplied in accordance with this invention by an apparatus in which a laser beam impinges on a target comprising carbon that is maintained in a heated zone. A similar apparatus has been described in the literature, for example, in U.S. Pat. No. 5,300,203, or in PCT/US96/14188, both of which are incorporated herein by reference, and in Chai, et al., "Fullerenes with Metals Inside," *J. Phys. Chem.*, vol. 95, no. 20, p. 7564 (1991). Alternatively carbon may be added to the live end by the direct action of the catalytic particle in the annealing zone with a carbon-bearing feedstock gas such as carbon monoxide and hydrocarbons, including aromatic hydrocarbons, e.g., benzene, toluene, xylene, cumene, ethylbenzene, naphthalene, phenanthrene, anthracene or mixtures thereof, non-aromic hydrocarbons, e.g., methane, ethane, propane, ethylene, propylene, acetylene or mixtures thereof; and oxygen-containing hydrocarbons, e.g., formaldehyde, acetaldehyde, acetone, methanol, ethanol or mixtures thereof.

According to this invention, a "live end" can also be produced on a carbon nanotube derivatized with chemical moieties which bind Group VI B or Group VIII B metal to the tube. This mode is discussed in greater detail below. Additional carbon vapor is then supplied to the live end of a carbon nanotube under the appropriate conditions to increase the length of the carbon nanotube.

The carbon nanotube that is formed is not always a single-wall carbon nanotube; it may be a multi-wall carbon nanotube having two, five, ten or any greater number of walls (concentric carbon nanotubes). Preferably, though, the carbon nanotube is a single-wall carbon nanotube, and this invention provides a way of selectively producing single-wall carbon nanotubes in greater and sometimes far greater abundance than multi-wall carbon nanotubes.

Elongation of Single-wall Nanotubes

As contemplated by this invention, growth or elongation of single-wall carbon nanotubes requires that carbon in vapor form be supplied to the live end of the growing nanotube in an annealing zone. In this application, the term "live end" of a carbon nanotube refers to the end of the carbon nanotube on which catalytic amounts of one or more Group VI B or VIII B transition metals are located. The catalyst should be present on the open SWNT ends as a metal cluster containing from about 10 metal atoms up to about 200 metal atoms (depending on the SWNT molecule diameter). Preferred are metal clusters having a cross-section equal to from about 0.5 to about 1.0 times the tube diameter (e.g., about 0.7 to 1.5 nm).

A carbon nanotube having a live end will grow in length by the catalytic addition of carbon from the vapor to the live end of the carbon nanotube if the live end is placed in an annealing zone and then additional carbon-containing vapor is supplied to the live end of the carbon nanotube. The annealing zone where the live end of the carbon nanotube is initially formed should be maintained at a temperature of 500° to 1500° C., more preferably 1000° to 1400° C. and most preferably 1100 to 1300° C. In embodiments of this invention where carbon nanotubes having live ends are caught and maintained in an annealing zone and grown in length by further addition of carbon (without the necessity of adding further Group VI B or VIII B transition metal vapor), the annealing zone may be cooler, 400° to 1500° C., preferably 400° to 1200° C., most preferably 500° to 700° C. The pressure in the annealing zone should be maintained in the range of pressure appropriate to the catalyst/feedstock system being used, i.e., 50 to 2000 Torr., more preferably 100 to 800 Torr, and most preferably 300 to 600 Torr in the case of carbon or hydrocarbon gasses, but up to 100 atmospheres in the case of CO feedstock. The atmosphere in the annealing zone will contain carbon in some form. Normally, the atmosphere in the annealing zone will also comprise a gas that sweeps the carbon vapor through the annealing zone to a collection zone. Any gas that does not prevent the formation of carbon nanotubes will work as the sweep gas, but preferably the sweep gas is an inert gas such as helium, neon, argon, krypton, xenon, or mixtures of two or more of these. Helium and Argon are most preferred. The use of a flowing inert gas provides the ability to control temperature, and more importantly, provides the ability to transport carbon to the live end of the carbon nanotube. In some embodiments of the invention, when other materials are being vaporized along with carbon, for example one or more Group VI B or VIII B transition metals, those compounds and vapors of those compounds will also be present in the atmosphere of the annealing zone. If a pure metal is used, the resulting vapor will comprise the metal. If a metal oxide is used, the resulting vapor will comprise the metal and ions or molecules of oxygen.

It is important to avoid the presence of too many materials that kill or significantly decrease the catalytic activity of the one or more Group VI B or VIII B transition metals at the live end of the carbon nanotube. It is known that the presence of too much water ($H_2O$) and/or oxygen ($O_2$) will kill or significantly decrease the catalytic activity of the one or more Group VI B or VIII B transition metals. Therefore, water and oxygen are preferably excluded from the atmosphere in the annealing zone. Ordinarily, the use of a sweep gas having less than 5 wt %, more preferably less than 1 wt % water and oxygen will be sufficient. Most preferably the water and oxygen will be less than 0.1 wt %.

The carbon-containing vapor supplied to the live end in the annealing zone may be provided by evaporation of a solid carbon target using energy supplied by an electric arc or laser, as described herein. However, once the single-wall carbon nanotube having a live end is formed, the live end will catalyze growth of the single-wall carbon nanotube at lower temperatures and with other carbon sources. An alternative carbon source for growing the SWNT may be fullerenes, that can be transported to the live end by the flowing sweep gas. The carbon source can be graphite particles carried to the live end by the sweep gas. The carbon source can be a hydrocarbon that is carried to the live end by a sweep gas or a hydrocarbon gas or mixture of hydrocarbon gasses introduced into the annealing zone. Hydrocarbons useful include methane, ethane, propane, butane, ethylene, propylene, benzene, toluene or any other paraffinic, olefinic, cyclic or aromatic hydrocarbon, or any other hydrocarbon. Another alternative that may be used as a source of carbon-containing vapor are other gaseous compounds that can form elemental carbon by disproportionation such as CO, $C_2F_4$ and $C_2H_4$.

Chemically Modified Carbon Nanotubes

Figure 22:
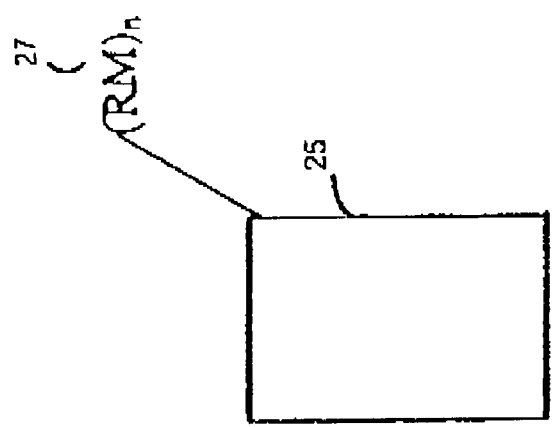
FIG. 22 illustrates a single-wall carbon nanotube that is open at the both ends having a chemically derivatized sidewall.
Figure 21:
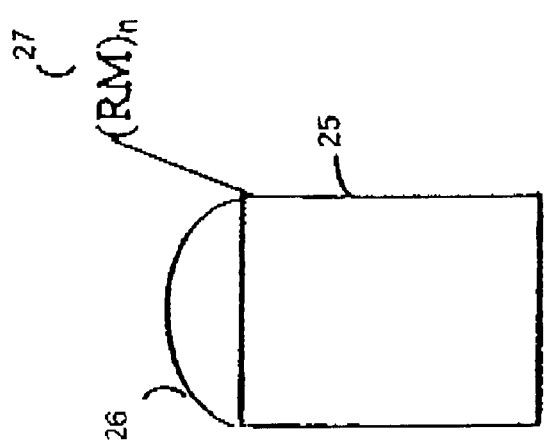
FIG. 21 illustrates a single-wall carbon nanotube that is capped at one end and open at the other end having a chemically derivatized sidewall.
Figure 20:
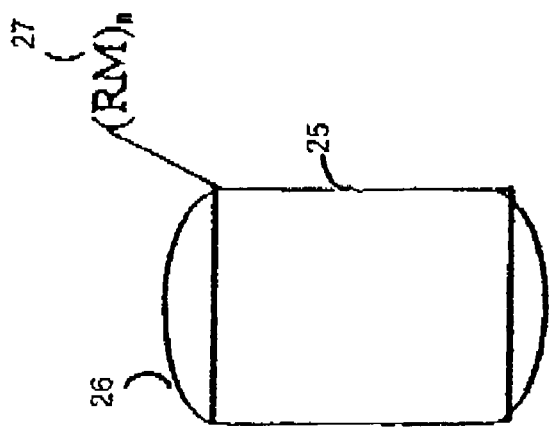
FIG. 20 illustrates a single-wall carbon nanotube that is capped at both ends having a chemically derivatized sidewall.

The present invention provides carbon nanotubes having chemically derivatized side walls. In preferred embodiments, the derivarization facilitates formation of more complex functional compounds with carbon nanotubes. Derivatization also enables complexing of Group VI B and/or Group VIII B metals on the nanotubes. In particularly preferred embodiments, the derivatized nanotubes are derivatized molecular growth precursors of this invention which may have the structures and functions reflected in FIGS. 20–22. In FIGS. 20–22, rectangle 25 is a substantially defect-free cylindrical graphene sheet (which optionally can be doped with non-carbon atoms) having from about $10^2$ to about $10^7$ carbon atoms, and having a length of from about 5 to about 10000 mm, preferably about 5 to about 500 mm; cap 26 is a fullerene cap that fits perfectly on the cylindrical graphene sheet, has at least six pentagons and the remainder hexagons and typically has at least about 30 carbon atoms; and (RM) 27 are functional compounds derivatized to the nanotube. Moreover:

M is a Group VI B or VIII B metal, n is a number from 10–100000, preferably 50 to 20000; and R is a linking or complexing moiety that can include groups selected from the group consisting of alkyl, acyl, aryl, aralkyl, halogen; substituted or unsubstituted thiol; unsubstituted or substituted amino; hydroxy, and OR' wherein R' is selected from the group consisting of hydrogen, alkyl, acyl, aryl aralkyl, unsubstituted or substituted amino; substituted or unsubstituted thiol; and halogen; and a linear or cyclic carbon chain optionally interrupted with one or more heteroatom, and optionally substituted with one or more =O, or =S, hydroxy, an aminoalkyl group, an amino acid, or a peptide of 2–8 amino acids.

Other embodiments of the derivatized nanotubes of this invention have structures as described above, except metal is not present and the R group does not necessarily serve to form complexes. The following definitions are used herein.

The term "alkyl" as employed herein includes both straight and branched chain radicals, for example methyl, ethyl, propyl, isopropyl, butyl, t-butyl, isobutyl, pentyl, hexyl, isohexyl, heptyl, 4,4-dimethylpentyl, octyl, 2,2,4-trimethylpentyl, nonyl, decyl, undecyl, dodecyl, the various branched chain isomers thereof. The chain may be linear or cyclic, saturated or unsaturated, containing, for example, double and triple bonds. The alkyl chain may be interrupted or substituted with, for example, one or more halogen, oxygen, hydroxy, silyl, amino, or other acceptable substituents.

The term "acyl" as used herein refers to carbonyl groups of the formula —COR wherein R may be any suitable substituent such as, for example, alkyl, aryl, aralkyl, halogen; substituted or unsubsubstituted thiol; unsubstituted or substituted amino, unsubstituted or substituted oxygen, hydroxy, or hydrogen.

The term "aryl" as employed herein refers to monocyclic, bicyclic or tricyclic aromatic groups containing from 6 to 14 carbons in the ring portion, such as phenyl, naphthyl, substituted phenyl, or substituted naphthyl, wherein the substituent on either the phenyl or naphthyl may be for example $C_{1-4}$ alkyl, halogen, $C_{1-4}$ alkoxy, hydroxy or nitro.

The term "aralkyl" as used herein refers to alkyl groups as discussed above having an aryl substituent, such as benzyl, p-nitrobenzyl, phenylethyl, diphenylmethyl, and triphenylmethyl.

The term "aromatic or non-aromatic ring" as used herein includes 5–8 membered aromatic and non-aromatic rings uninterrupted or interrupted with one or more heteroatom, for example O, S, SO, $SO_2$, and N, or the ring may be unsubstituted or substituted with, for example, halogen, alkyl, acyl, hydroxy, aryl, and amino, said heteroatom and substituent may also be substituted with, for example, alkyl, acyl, aryl, or aralkyl.

The term "linear or cyclic" when used herein includes, for example, a linear chain which may optionally be interrupted by an aromatic or non-aromatic ring. Cyclic chain includes, for example, an aromatic or non-aromatic ring which may be connected to, for example, a carbon chain which either precedes or follows the ring.

The term "substituted amino" as used herein refers to an amino which may be substituted with one or more substituent, for example, alkyl, acyl, aryl, aralkyl, hydroxy, and hydrogen.

The term "substituted thiol" as used herein refers to a thiol which may be substituted with one or more substituent, for example, alkyl, acyl, aryl, aralkyl, hydroxy, and hydrogen.

Typically, open ends may contain up to about 20 substituents and closed ends may contain up to about 30 substituents. It is preferred, due to stearic hindrance, to employ up to about 12 substituents per end.

In addition to the above described external derivatization, the SWNT molecules of the present invention can be modified endohedrally, i.e., by including one or more other atoms or molecules inside the structure, as is known in the endohedral fullerene art.

To produce endohedral tubular carbon molecules, the internal species (e.g., metal atom) can either be introduced during the SWNT formation process or added after preparation of the nanotubes.

Endohedrally loaded tubular carbon molecules can then be separated from empty tubes and any remaining loading materials by taking advantage of the new properties introduced into the loaded tubular molecules, for example, where the metal atom imparts magnetic or paramagnetic properties to the tubes, or the bucky ball imparts extra mass to the tubes. Separation and purification methods based on these properties and others will be readily apparent to those skilled in the art.

Derivatization of SWNT Sidewalls with Fluorine

Since the discovery of single wall carbon nanotubes (SWNT) Iijima, et al. (1993), there has been a flurry of research activity aimed at understanding their physical properties (Issi, et al. (1995), *Carbon*, 33:941–948), elucidating their growth mechanisms (Cornwell, et al. (1997), *Chem. Phys. Lett.*, 278:262–266), and developing novel uses for them (Dillon, et al. (1997), *Nature*, 386:377–389). Chemistry involving SWNT is still in its infancy. This is due, in large part, to previous difficulties in obtaining reasonable quantities of highly purified SWNT.

Progress in the bulk synthesis and purification (Rinzler, et al., 1998, *App. Phys.* A, 67:29–37) of SWNT is now making available high quality samples in sufficient quantities to begin exploring the chemical modification of this fascinating class of materials. Recently, sono-chemistry was employed to cut the long, intertangled tubes into independent, macromolecular scale, open tube fragments (50–300 nm long) (Liu, et al., 1998). In that work, the high reactivity of the-dangling carbon bonds at the open tube ends was exploited to tether the tubes to gold particles via thiol linkages.

In contrast to the open tube ends, the side-walls of the SWNT, by virtue of their aromatic nature, possess a chemical stability akin to that of the basal plane of graphite (Aihara, 1994, *J. Phys. Chem.*, 98:9773–9776). The chemistry available for modification of the nanotube side-wall (without disruption of the tubular structure) is thus significantly more restrictive. However, the present inventors have adapted technology developed in the fluorination of graphite (see, eg., Lagow, et al., 1974, *J. Chem. Soc., Dalton Trans.*, 12:1268–1273) to the chemical manipulation of the SWNT side-wall by fluorinating high purity SWNT and then defluorinating them. Once fluorinated, single-wall carbon nanotubes can serve a staging point for a wide variety of side-wall chemical functionalizations, in a manner similar to that observed for fluorinated fullerenes (see Taylor, et al., 1992, *J. Chem. Soc., Chem. Comm.*, 9:665–667, incorporated herein by reference).

According to the present invention, single-wall carbon nanotubes are derivatized by exposure to a fluorinating agent, which may be fluorine gas or any other well known fluorinating agent such as $XeF_2$, $XeF_4$, $ClF_3$, $BrF_3$, or $IF_5$. $XeF_2$, and $XeF_4$ may be advantageous, being free of HF. Alternatively, solid fluorinating agents, such as $AgF_2$ or $MnF_3$, may be reacted in slurry with SWNT.

Purified single wall carbon nanotubes (SWNT) were fluorinated by the inventors by treatment with $F_2$ at several different temperatures and concentrations using various mixtures of about 5% $F_2$ in a one-atmosphere pressure mixture with rare gases, including He and Ar. The reactor temperature was between 150° C. and 400° C. Infrared spectroscopy was used to verify the existence of covalent carbon-fluorine bonds. Product stoichiometries were determined and transmission electron microscopy (TEM) was used to verify whether or not the fluorination was destructive of the tubes. SWNT fluorinated at three different temperatures were then defluorinated using hydrazine. Raman spectroscopy was used to verify whether or not the products of the defluorination were in fact SWNT. It was determined, via scanning electron microscopy (SEM) and two-point resistance measurements, that the bulk of the SWNT survive the fluorination process at temperatures up to 325° C. and that the fluorine can be effectively removed from the tubes with hydrazine to regenerate the unfluorinated starting material.

Not unexpectedly, the electronic properties of the fluorinated tubes differ dramatically from those of their unfluorinated counterparts. While the untreated SWNT are good conductors (10–15 Ω two probe resistance across the length of the ~10×3 mm×30 µm bucky paper samples), the tubes fluorinated at temperatures of 250° C. and above are insulators (two probe resistance >20 MΩ).

Gravimetric and electron microprobe analysis demonstrated that large amounts of fluorine can be added to SWNT. Resistance measurements along with vibrational spectroscopy (Raman, IR) confirm the formation of new chemical bonds to the nanotube superstructure. Contributions of absorbed molecular fluorine to the overall fluorine uptake are precluded at these temperatures (Watanabe, et al., 1988). It may be concluded, therefore, that fluorine is being covalently attached to the side wall of the SWNT.

TEM studies have shown that at fluorination temperatures as high as 325° C., the majority of the fluorination product maintains a tube-like structure. These studies also indicate that at 500° C., the single wall tubular structure does not survive the fluorination process and that some MWNT-like structures are being formed.

From the product stoichiometries, resistance measurements and IR spectra it is clear that reaction temperatures in excess of 150° C. allow one to covalently add significant amounts of fluorine to the tube wall. The small amount of fluorine that does show up in the product of the 150° C. fluorination reaction could be attributed to a combination of absorbed fluorine and fluorination of the end caps of the SWNT.

Fluoride can also be effectively removed from the SWNT using anhydrous hydrazine and that the rejuvenated product is in fact a SWNT. The inventors have found that, once fluorinated, SWNT can be defluorinated with anhydrous hydrazine via the following reaction: $CF_n+(n/4)N_2H_4 \rightarrow C + nHF+(n/4)N_2$. From the results of these defluorination experiments and the Raman and SEM studies associated with them, it appears that a majority of the tubes are destroyed at fluorination temperatures of above 400° C., whereas only a slight amount of tube destruction occurs at 250° C.

For reactions in which only the outside of the tube is being fluorinated (the SWNT used in this study were closed at the ends), there is a limiting stoichiometry of $C_2F$ for which the fluorinated tube can still maintain its tube-like (albeit puckered) structure. This is supported by the product stoichiometries obtained via elemental analysis and the evidence of significant tube destruction at fluorination temperatures greater than 325° C. Further addition of fluorine would then lead to the breaking of carbon-carbon bonds and, hence, destruction of the tube. Accordingly, this invention provides a method of derivatizing SWNT with $F_2$ to add fluorine substituents to the exterior of the sidewalls in stoichiometries of up to $C_2F$, although lesser amounts of fluorine can also be attached by further diluting the fluorine or by lowering the reaction temperature.

Changing the Derivatization of SWNT by Fluorine Substitution

Because the inertness of the SWNT side wall approximates that of the basal plane of graphite, chemistry involving the SWNT side wall may be quite limited. However, the present invention provides methods for fluorination of single wall carbon nanotubes (SWNT) where fluorine is covalently bound to the side wall of the nanotube and thus provide sites for chemical reactions to occur. Functionalization via a fluorinated precursor may thus provide an attractive route to a wide range of side wall derivatizations.

In a particular embodiment, highly purified single wall carbon nanotubes (SWNTs) may be fluorinated to form "fluorotubes" which can then be solvated as individual tubes. For example, fluorotubes may be solvated in various alcohol solvents via ultrasonication. The solvation of individual fluorotubes has been verified by dispersing the solvated tubes on a mica substrate and examining them with atomic force microscopy (AFM). Elemental analysis of the tubes reveals that light sonication in alcohol solvents does not remove significant amounts of the fluorine. These solutions will persist long enough (over a week) to permit solution phase chemistry to be carried out on the fluorotubes. For example, the solvated fluorotubes can be treated with hydrazine to remove fluorine, leading to precipitation from solution of normal, unfluorinated SWNTs. Alternatively, fluorotubes can be reacted with sodium methoxide to yield methoxylated SWNTs. These reaction products have also been characterized by elemental analysis and a variety of spectroscopies and microscopies.

The present inventors have, for the first time, functionalized the sidewalls of SWNTs by reacting them with elemental fluorine. The inventors have discovered that fluorine could be added to the side wall of carbon nanotubes yielding stoichiometries up to approximately $C_2F$ without destruction of the tube-like structure. The inventors have also discovered that a high degree of solvation can be achieved by sonicating fluorinated SWNTs in a variety of alcohol solvents such as methanol, ethanol, and isopropanol. As demonstrated herein, reactions can be carried out on these nanotubes while in solution by reacting them with hydrazine which serves as a defluorinating agent. It has also been demonstrated that these "fluorotubes" can be reacted with sodium methoxide (a strong nucleophile) while in solution to form methoxylated SWNTs.

The inventors have shown that single wall carbon nanotubes can be fluorinated and then sonicated in alcohols to form stable solutions of fluorotubes. This solvation allows one to manipulate the fluorotubes in ways that were previously unavailable and opens the door to a wide variety of possibilities with respect to exploring the physical and chemical properties of fluorotubes. "Tuning" the fluorine content of a fluorotube by first fluorinating it heterogeneously, solvating it in an alcohol, and then defluorinating it with substoichiometric quantities of hydrazine is consequently available as a way of making a wide variety fluorotubes with differing fluorine contents and in some instances quite different properties.

The inventors have further demonstrated that once solvated, these fluorotubes can then be reacted with species while in solution to either defluorinate or further functionalize them. The chemistry possible with these solvated fluorotubes provides an important route to the synthesis of a wide variety of functionalized nanotubes having many different and useful properties.

An exemplary derivatization is the methylation of SWNT. Methylated SWNT are the product of the nucleophilic substitution of fluorine (attached to the SWNT side wall) by the methyl groups in methyl lithium. Nucleophilic substitution of this type has been previously reported for the reaction between fluorinated $C_{60}$ and alkyl lithium species (Taylor, et al., 1992). The C—F bonds in fullerene cages and tubes are weakened relative to C—F bonds in alkyl fluorides by an eclipsing strain effect (Taylor, 1998 *Russian Chem. Bull.*, 47:823–832). This renders the bonds more susceptible to nucleophilic attack. A normal $S_N2$ process is geometrically impossible and a $S_N1$ process would be extremely unlikely, so either a novel front side displacement or possibly an addition-elimination process is responsible for the nucleophilic substitution (See Taylor, 1995, in "The Chemistry of Fullerenes," R. Taylor, ed., world Scientific Publishing, London, pp.208–209).

EXAMPLES

Example 1
1.1 Fluorination of Single-wall Carbon Nanotubes

Single-walled carbon nanotubes were produced by the dual pulsed laser vaporization of Co/Ni doped graphite rods and purified by techniques described previously (Rinzler, et al., 1998). The purification product is a metastable colloidal suspension of SWNT "ropes" (bundles of hexagonally close packed tubes ranging from a few to 200 SWNT, See Thess, et al., 1996) in a 0.2% aqueous solution of Triton X-100 surfactant. Filtering the solution through a PTFE filter membrane and washing with methanol to remove residual surfactant leaves a black film on the surface. If this layer is sufficiently thick (10–75 µm) it can be peeled off to form a free standing film or "bucky paper" of SWNT. This form has appreciable mechanical integrity and is convenient for handling, and for electrical conductivity and Raman scattering measurements. It is the fluorination of this "bucky paper" that is described here.

In fluorinating the SWNT, elemental fluorine (Air Products, 98%) was used as the fluorinating agent. HF, being the major impurity in the fluorine, was removed by passing it through an HF trap (Matheson Gas Products) containing sodium fluoride pellets. The fluorine, diluted with helium (Trigas, 99.995%), was then passed through a temperature-controlled Monel flow reactor containing the SWNT sample.

Prior to fluorination, the purified "bucky paper" was vacuum baked at 1100° C. ($2 \times 10^{-6}$ Torr) for several hours in order to desorb any residual surface contaminants. For each reaction a pre-weighed piece of "bucky paper (weighing 150–200 µg) was used. $F_2$ and He flow rates for each reaction were 2 sccm and 20 sccm, respectively. In each case the reaction time was 5 hours. The only variable was reaction temperature. As the kinetics of inorganic carbon+fluorine reactions are highly temperature dependent (Watanabe, et al., 1988, "Graphite fluorides," Elsevier, Amsterdam), several reactions were carried out at the following temperatures: 150° C., 250° C., 325° C., 400° C., 500° C. and 600° C. At reaction temperatures of 325° C. and 400° C., the fluorination was begun at 250° C. and after one hour, the $F_2$ flow was stopped and the reactor temperature brought up to the appropriate level for an additional 4 hours. For the reactions at 500° C. and 600° C., the sample was fluorinated for 1 hour at 250° C., 1 hour at 400° C. and then 3 hours at the specified reaction temperature. The rationale behind this "stepped reaction temperature procedure" was to minimize, as much as possible, the decomposition: $CF_4$, $C_2F_4$, $C_2F_6$, etc. which has been well documented in the fluorination of graphite (Kamarchik, et al., 1978, *Acc. Chem. Res.*, 11:196–300) and fullerenes (Selig, et al., 1991, *J. Am. Chem. Soc.*, 113:5475–5476).

Product stoichiometries as a function of reaction temperature were obtained both gravimetrically (TA Instruments TGA-DTA 2960 microbalance) and via electron microprobe analysis (Cameca SX 50). Infared spectroscopy (Perkin-Elmer Paragon 1000 FT-IR) was used to confirm the presence of covalently bound fluorine. Transmission electron microscopy (JEOL model 2010 TEM using 100 keV beam energy) was used to determine if, and at what temperature the tubes were being destroyed (i.e., unzipped") by the fluorination. Raman spectroscopy (Jobin Yvon-Spex model HR460 monochrometer coupled with an ISA Spectrum ONE series CCD detector and using a 532 nm Nd:YAG laser excitation source), scanning electron microscopy (JEOL model JSM-6320F field emission SEM using 5keV beam energy) and two-point resistivity measurements were used to analyze the untreated, fluorinated and defluorinated SWNT samples.

Infared spectroscopy (KBr pellet method) confirmed the presence of covalently bound fluorine (peaks in the 1220–12.50 $cm^{-1}$ region) in the samples fluorinated, at temperatures of 250° C. and higher. No C—F stretching frequency was seen for the sample fluorinated at 150° C. and its two-point resistance (5mm apart) was ~100 which therefore precludes large amounts of fluorine being covalently bound to the SWNT side wall. Product stoichiometries of the fluorination reactions are shown in Table 1. Discrepancies between the gravimetric and microprobe analyses can be attributed to product decomposition as described above, especially at the higher temperatures.

FIG. 1-A shows a TEM image of the purified, unreacted SWNT material. FIG. 1-B shows a TEM image of SWNT fluorinated at 325° C. As can be seen from the image, the tubes remain largely intact after treatment under these conditions. FIG. 1-C is a TEM image of SWNT fluorinated at 500° C. Here it would appear that the tubes are essentially all destroyed. However, a fair number of nested tube-like graphic structures reminiscent of multiwall carbon nanotubes (MWNT) seem to have been generated as a result of the high temperature reaction. These structures are shown in FIG. 1-D.

The fluorination of MWNT has been reported previously (Hamwi, et al., 1997, *Carbon*, 35:723–728). This was done at two temperatures: 25° C. and 500° C. The room temperature reaction was done with a $F_2$, HF and $IF_5$ mixture and yielded an intercalated type compound. The reaction carried out at 500° C. was done with $F_2$, and was determined to have destroyed the tube structure to yield a graphite fluoride compound of stoichiometry CF. In light of this, it is not too surprising that destruction of the SWNT was observed at 500° C., but somewhat surprising that MWNT-like structures are formed. The generation of these may be a consequence of residual metal catalysts present in the sample.

TABLE 1

Reaction product stoichiometries determined by both gravimetric and electron microprobe analysis.

| Reaction temp.° C. | 150 | 250 | 325 | 400 | 500 | 600 |
|---|---|---|---|---|---|---|
| gravimetric | $CF_{0.114}$ | $CF_{0.521}$ | $CF_{0.495}$ | $CF_{0.565}$ | * | * |
| microprobe | $CF_{0.097}$ | $CF_{0.458}$ | $CF_{0.554}$ | $CF_{0.647}$ | $CF_{0.815}$ | $CF_{0.99}$ |

* no determination at these temperatures.

1.2 Delfuorination of Single-wall Carbon Nanotubes

Once fluorinated, SWNT were defluorinated with anhydrous hydrazine (Aldrich, 98%). To the pieces of "bucky paper", fluorinated at 250° C., 325° C. and 400° C., was added 5 ml of hydrazine under an inert atmosphere at room temperature. The SWNT were allowed to sit in the hydrazine for one hour prior to filtering and washing with water.

Figure 2:
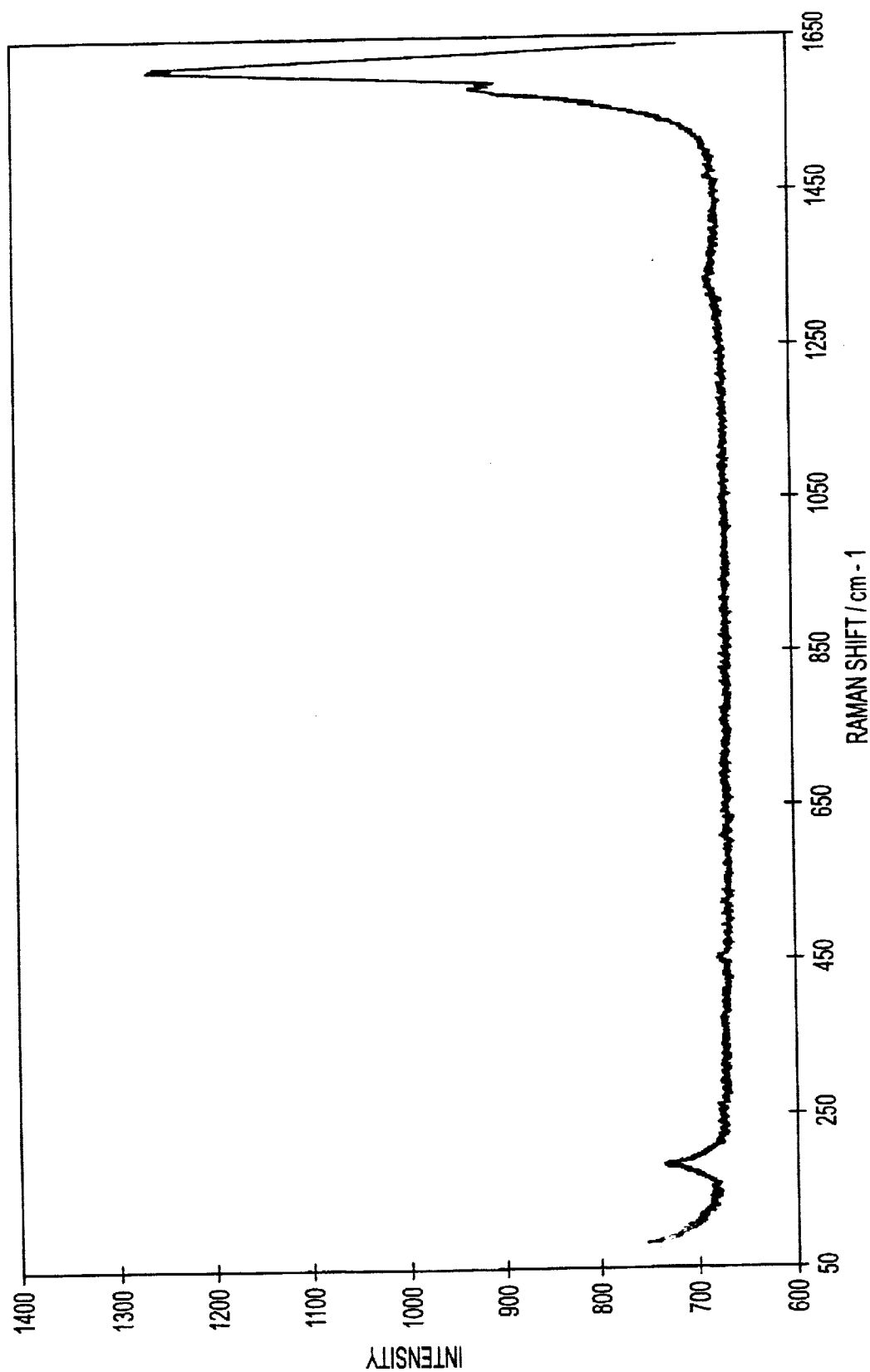
FIG. 2. Raman spectrum of pure, unreacted carbon SWNT.
Figure 3:
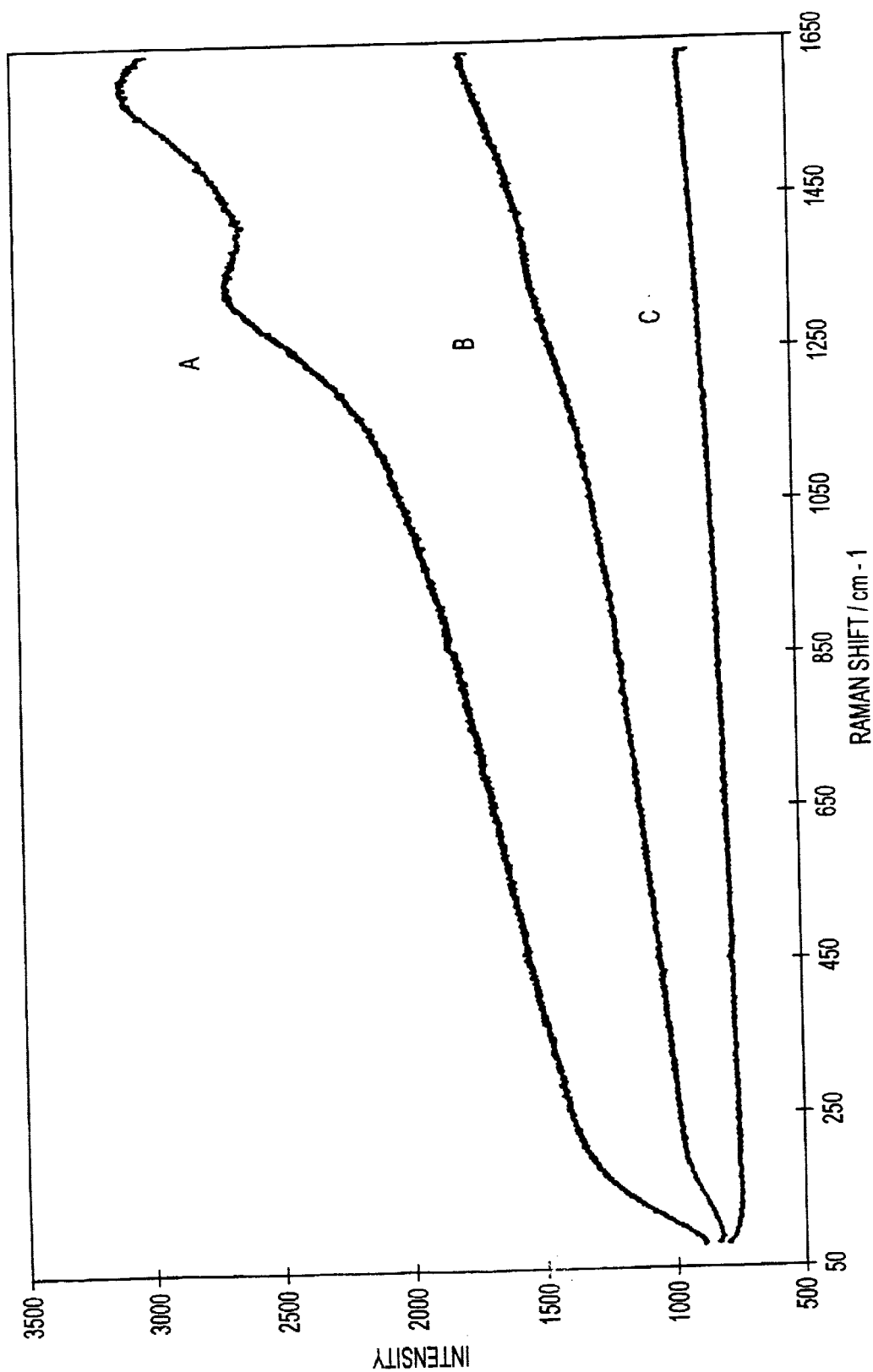
FIG. 3. Raman spectra of SWNT fluorinated at A) 250° C. B) 325° C. and C) 400° C.

As the Raman spectroscopy of SWNT has been well developed both theoretically (Richter, et al., 1997, *Phys, Rev. Lett.*, 79:2738–2741) and experimentally (Rao, et al., 1998, *Science*, 275:187–191), it was used to examine the results of both the fluorination and subsequent defluorination of the SWNT. FIG. 2 shows the Raman spectrum of the pure, unadulterated SWNT material. The smaller peak at 186 $cm^{-1}$ is due to a characteristic breathing mode of the SWNT. Raman spectra of SWNT fluorinated for 5 hours at reaction temperatures of 250° C., 325° C. and 400° C. are shown in FIG. 3. Trace A, corresponding to the reaction at 250° C., shows only two broad peaks centered around 1340 $cm^{-1}$ and 1580 $cm^{-1}$ 'and a broad band fluorescence. The Raman peaks correspond to $sp^3$ and $sp^2$ carbon stretching modes, respectively. At higher reaction temps, yielding high F to C ratios, these peaks disappear and the fluorescence is attenuated. As C—F bonds are not very polarizable, it is understandable that they are not seen in the Raman spectra presented here.

Figure 4:
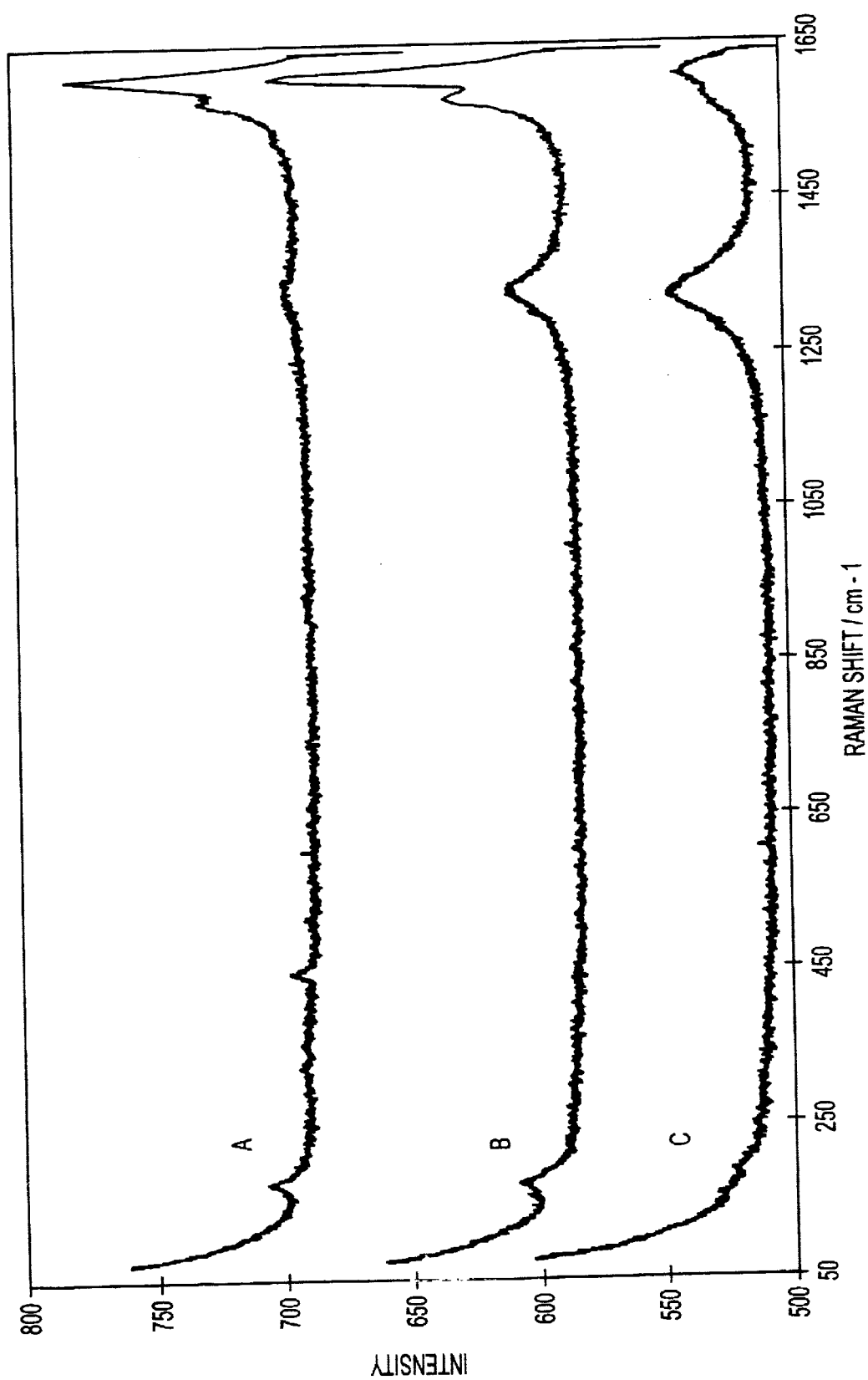
FIG. 4. Raman spectra showing the defluorination of the nanotubes originally fluorinated at A) 250° C. B) 325° C. and C) 400° C.
Figure 5A:
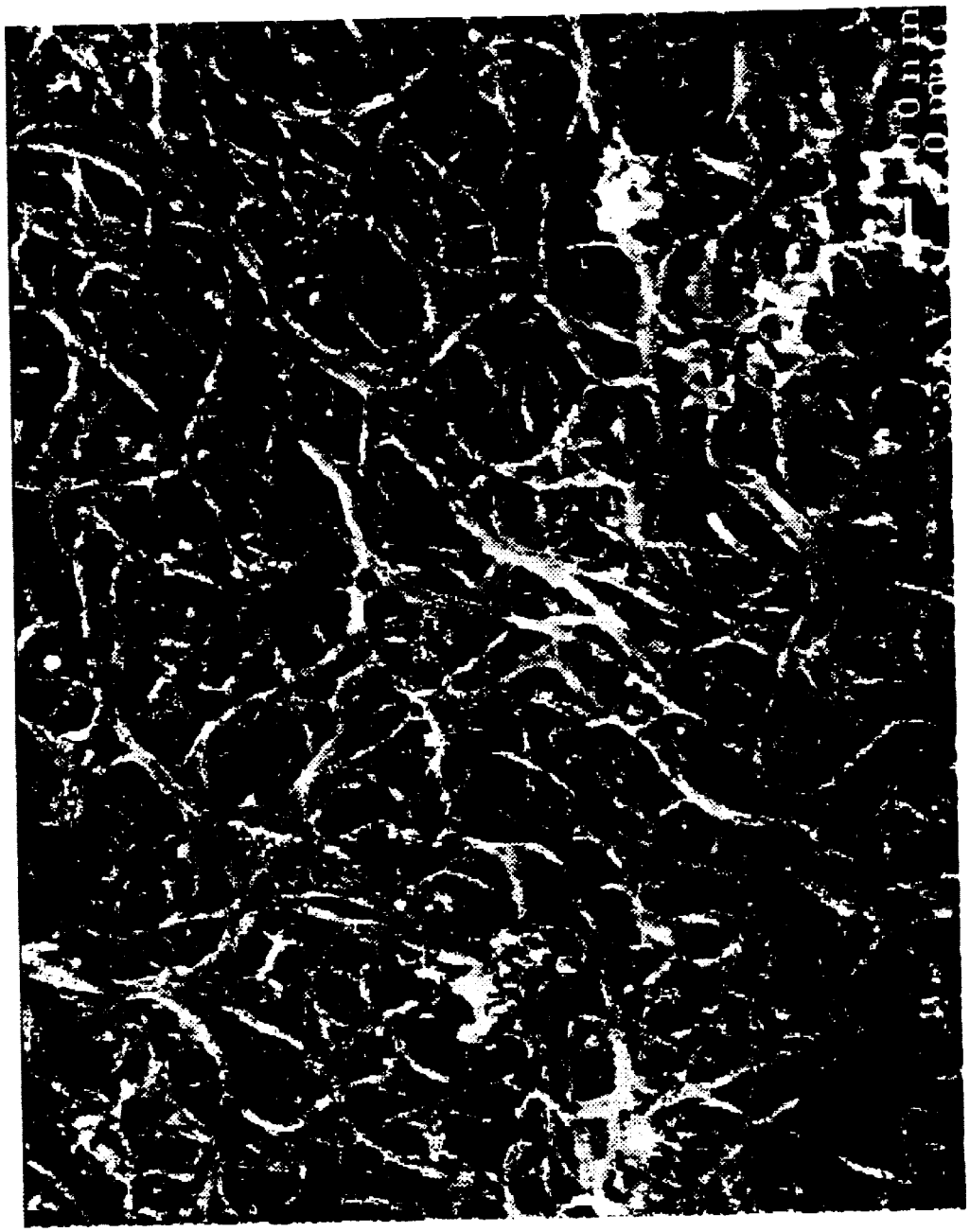
FIG. 5. A) SEM of pure, unreacted SWNT B) SEM of SWNT after having been fluorinated at 325° C. for 5 hours C) SEM of SWNT fluorinated at 325° C. and then defluorinated in hydrazine.
Figure 5B:
Figure 5C:

Raman spectra of the defluorinated products of the SWNT originally fluorinated at 250° C., 325° C. and 400° C. are shown in FIG. 4. Traces A, B and C correspond to the material originally fluorinated at 250° C., 325° C. and 400° C., respectively. As can be seen in traces A and B, the characteristic breathing mode at 186 cm$^{-1}$ returns upon defluorination. This is not true in trace C, indicating that the tubes are largely destroyed at 400° C. Additionally, the peak at 1340 cm$^{-1}$ grows relative to the characteristic SWNT peaks with increasing fluorination temperature. This can be attributed to one or both of the following factors: one, tubes are being "unzipped" much more readily at the higher temperatures and secondly, at higher reaction temperatures, a greater amount of decomposition of the type: $CF_4$, $C_2F_4$, $C_2F_6$, etc, is occurring SEM images and two-point resistivity measurements were obtained on a single piece of "bucky paper" after each of the following stages: purification, fluorination at 325° C. and defluorination in hydrazine at room temperature for one hour. FIG. 5-A shows the purified starting material. FIG. 5-B shows the same piece after having been fluorinated at 325° C. for 5 hours. The image shows excessive charging due to its insulating nature, but the "rope-like" structure of tubes is still evident. Finally, FIG. 5-C shows the same piece of "bucky paper" after having been defluorinated in hydrazine. The two-point resistance of the purified starting material is 15–16 Ω measured 5 mm across the surface of the "bucky paper". Identical measurements on the fluorinated and defluorinated "bucky paper" yielded a resistance of >20 MΩ and 125–130 Ω respectively. It is interesting to note that the defluorinated material recovers most, but not all of its original conductivity.

Example 2

2.1 Preparation of Fluorinated Single-wall Carbon Nanotubes

SWNT were produced by the dual pulsed laser vaporization of Co/Ni doped graphite rods and purified as discussed previously (Rinzler, et al., 1998). The highly purified product consists of colloidally suspended bundles or "ropes" of SWNT (Liu, et al., 1998). Filtering this over a 0.2 micron PTFE filter membrane and rinsing with methanol yields a black film that can be peeled off to give a freestanding "bucky paper." This paper was then oven baked for several hours at 150° C. to remove any residual solvent. The baked "bucky paper" was then loaded into a temperature controlled monel flow reactor where it was purged at 250° C. under a stream of He for ~1 hour. A 10% $F_2$ in He mixture was then passed over the sample after first being passed over NaF to remove any HF present. This yielded material with stoichiometries ranging from $C_3F$ to $C_2F$ (as determined by electron microprobe analysis) depending on reaction time (between 8 and 12 hours) and on the quantity being fluorinated.

2.2 Methylated Single-wall Carbon Nanotubes

Once fluorinated, the nanotubes were then placed in a reaction flask under a $N_2$ purge. Methyl lithium (1.4 M in diethyl ether, Aldrich) was then added in significant molar excess via syringe through a rubber septum in the reaction flask. The reaction mixture was then refluxed for three hours and after which, the methyl lithium was neutralized with a water/ether mixture. The resulting material was then filtered, washed with 3M HCl (to remove LiF and LiOH) followed by methanol and then oven dried at 130° C. Electron microprobe analysis revealed the fluorine content of this material to be 3.7 atomic percent (down from around 30%). SEM and TEM analysis confirmed that the rope and tube structures survived both the fluorination and methylation steps.

Figure 6A:
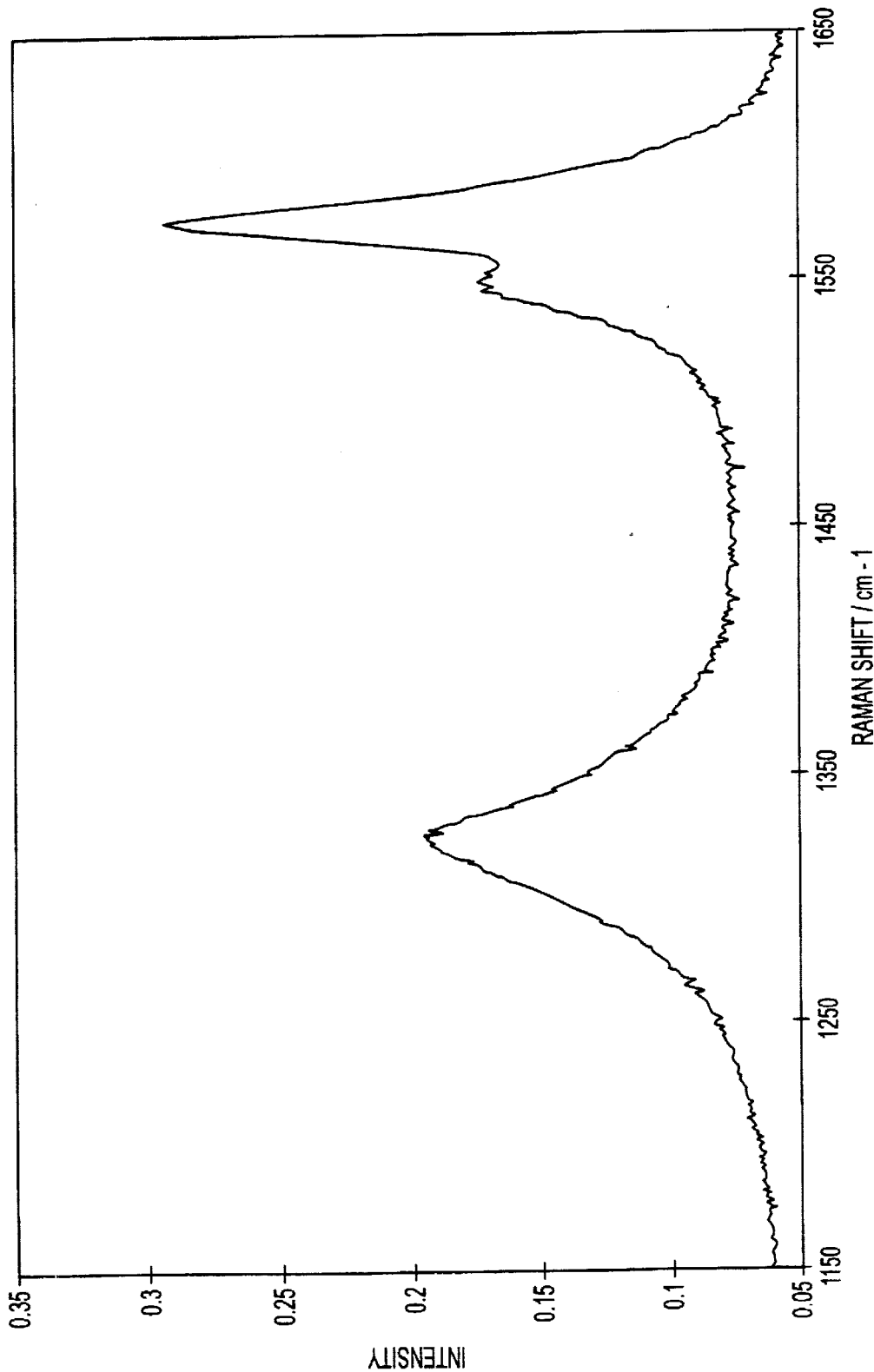
FIG. 6. A) Raman spectrum of SWNT after being fluorinated and then methylated. B) Raman spectrum of the pyrolyzed methylated. SWNT which looks exactly like the Raman spectrum of untreated. SWNT.
Figure 6B:
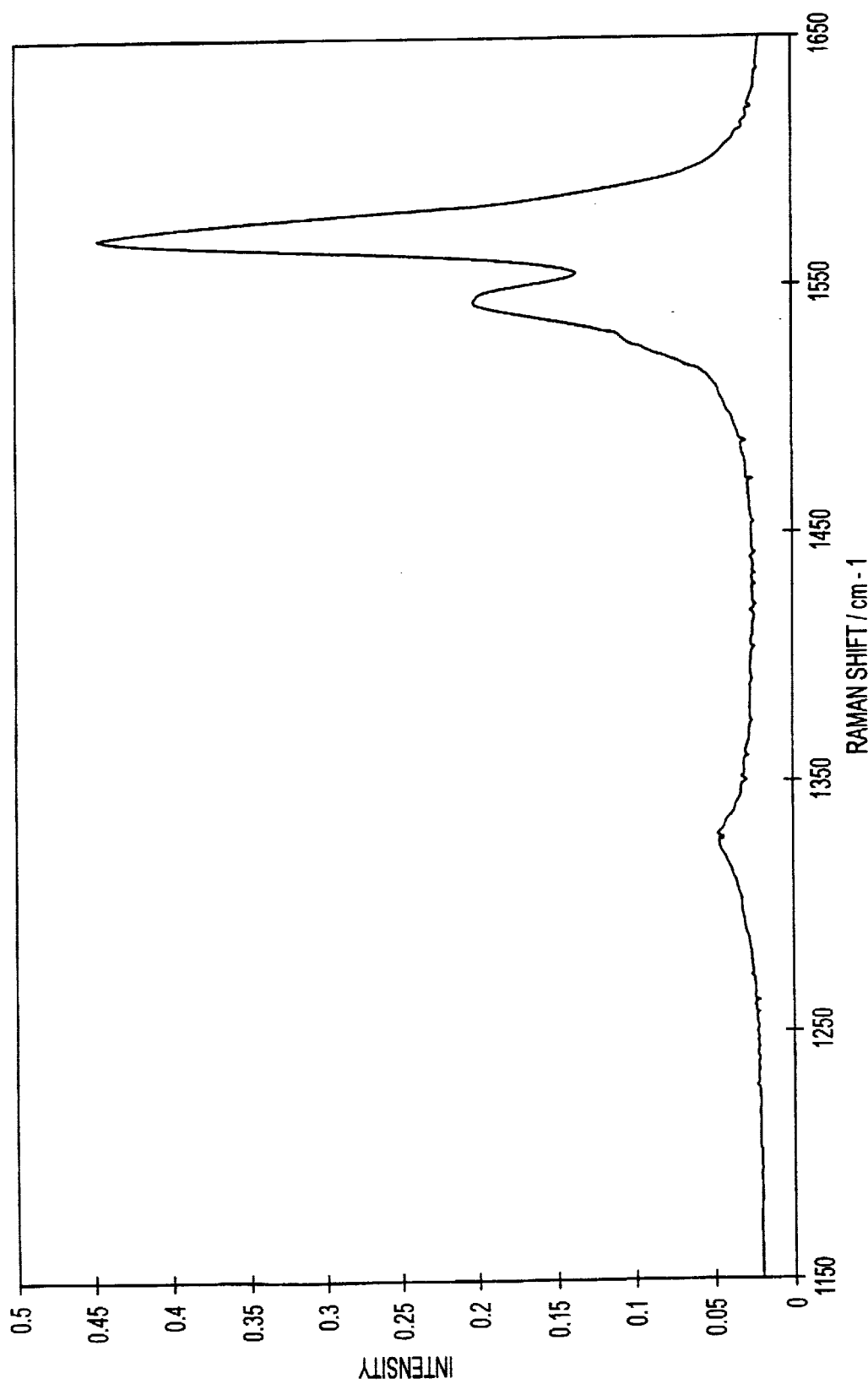
Figure 7:
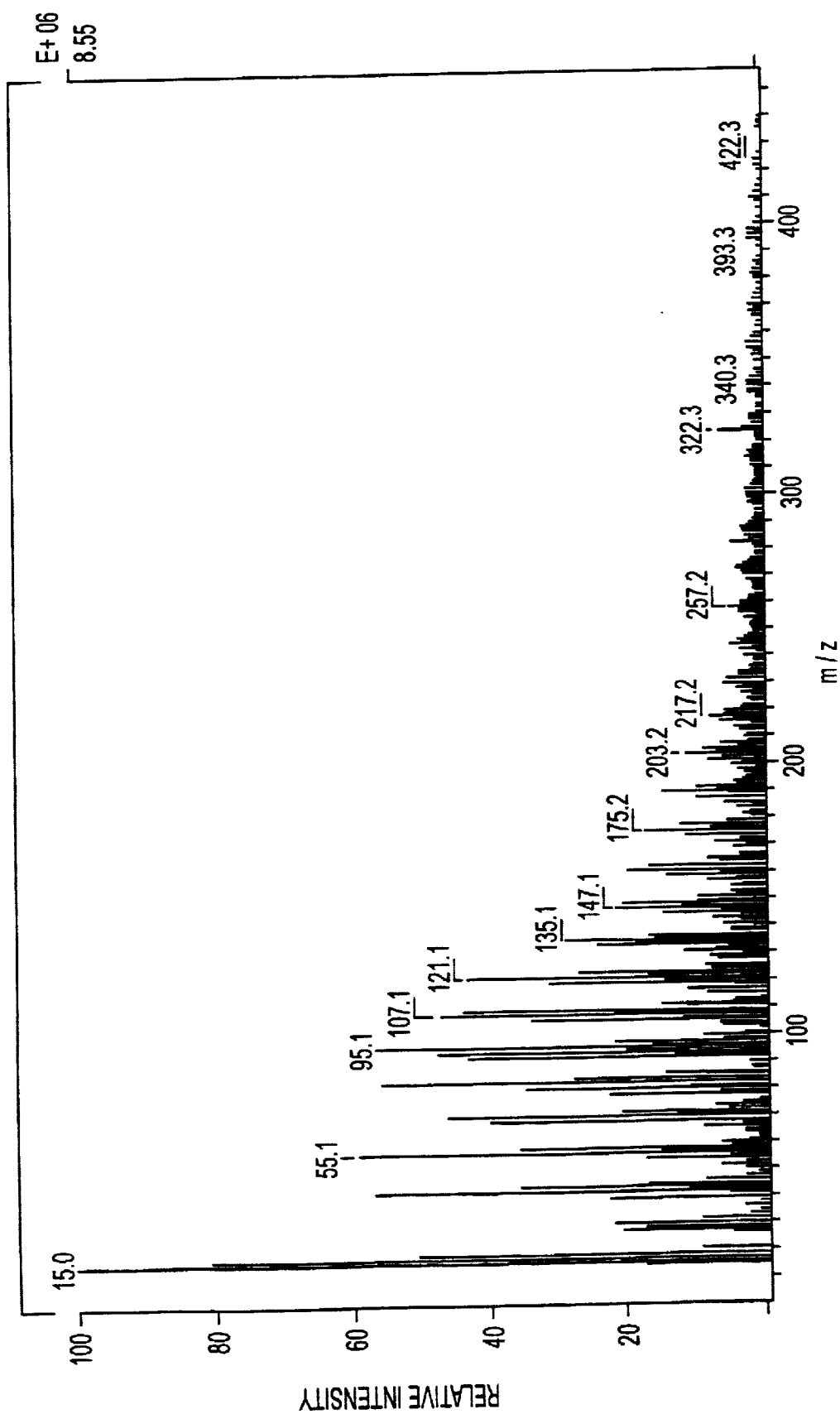
FIG. 7. B) EI mass spectrum of products given off during the pyrolysis of methylated SWNT. This spectrum corresponds to a probe temperature of ~400° C.

The Raman spectroscopy of SWNT is now well known (Rao, et al., 1998). Raman spectroscopy of the methylated nanotube product was obtained on a Spex Triplemate spectrometer equipped with a CCD detector and using a 514.5 nm Ar laser excitation source. The spectrum reveals that significant alteration has taken place (FIG. 6). Pyrolysis of this material in Ar at 700° C. regenerates the original SWNT as evidenced by its Raman spectrum. TGA of the pyrolysis process reveals a 25% mass loss upon heating to 700° C. EI mass spectroscopy of the pyrolysis products reveals $CH_3$ groups to be the major species being evolved during the pyrolysis (FIG. 7) with the rest of the mass peaks being consistent with methyl recombination pathways during pyrolysis.

The electrical properties of the SWNT change dramatically as they are functionalized. The untreated SWNT are essentially metallic and their two point resistance (essentially a contact resistance, Bozhko, et al., 1998, *Appl. Phys.* A, 67:75–77) measured across 5 mm of the "bucky paper" surface is 10–15 Ω. When fluorinated, the tubes become insulating and the two point resistance exceeds 20 MΩ. After methylation the tubes possess a two point resistance of ~20 kΩ. Pyrolysis of the methylated product brings the resistance down to ~100 Ω. Incomplete return of the electrical conductivity upon pyrolysis may be due to an increased contact resistance that results from disorder induced into the rope lattice following the sequence of reaction steps.

The methylated SWNT could be suspended quite readily by sonication in chloroform. Dispersal of this suspension on a Si wafer followed by AFM analysis confirmed the nondestructive nature of the sonication process. Additionally, a large number of single tubes could be seen. This was not true of similarly exposed, untreated SWNT.

Figure 8:
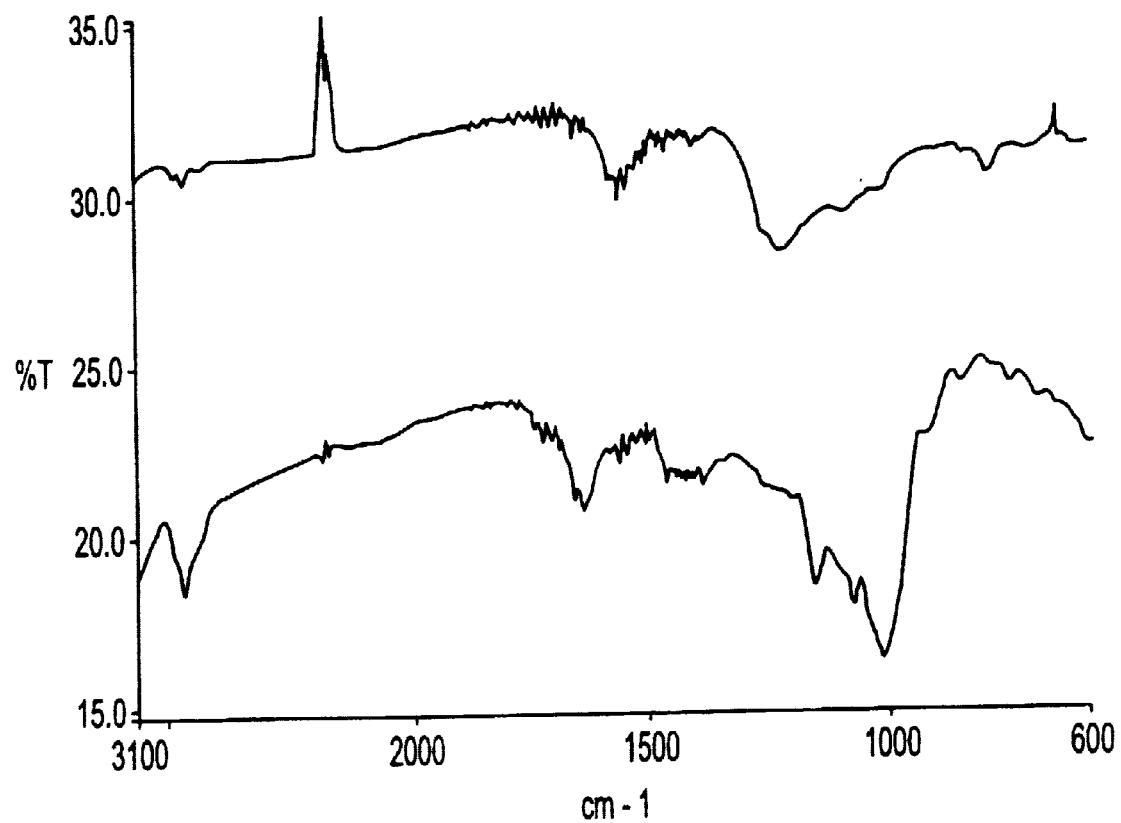
FIG. 8. A) Infrared spectrum of the product of a 3 hour methylation reaction B) Infrared spectrum of the product of a 12 hour methylation reaction.

To get an infrared spectrum of the product, the dried methylated material was suspended in $CDCl_3$ and dispersed over KBr powder which was then dried and pressed into a pellet. By using deuterated chloroform we eliminated the possibility of seeing C—H stretching modes due to the presence of residual solvent. IR analysis of the pellet revealed a significant amount of C—H stretching in the ~2950 cm$^-$ region of the spectrum as shown in FIG. 8. Also present, however, is a significant C—F stretching band indicating that not all of the fluorine had been displaced. This might be because the bulky methyl lithium cannot penetrate the rope lattice to the extent that the fluorine could in the original fluorination. Alternatively, the cage is likely to become less electronegative and, therefore, less susceptible to nucleophilic attack as successive fluorines are displaced (see Boltalina, et al., 1996, *J. Chem. Soc., Perkin Trans.*, 2:2275–2278).

The methylated tubes were not suspendable in any of the nonpolar hydrocarbon solvents tried, although not all possibilities were investigated. The fact that the suspendability of the methylated tubes in $CHCl_3$ is superior to that of the untreated tubes is interesting, however. Using a suitable solvent to suspend the methylated SWNT as individual tubes capable of being manipulated individually, will have significant benefits. Alternatively, other nucleophiles, e.g. butyl, can be substituted for the fluorine to render the SWNT more suspendable in a suitable solvent, which is equally significant.

In summary, SWNT were methylated by first fluorinating them and then reacting the fluorinated product with methyl lithium. This methylation of fluorinated SWNT precursors proceeds through a novel nucleophilic substitution pathway that is capable of generating a wide range of substituted SWNT products.

Example 3

3.1 Preparation of Highly Purified SWNTs

Figure 9:
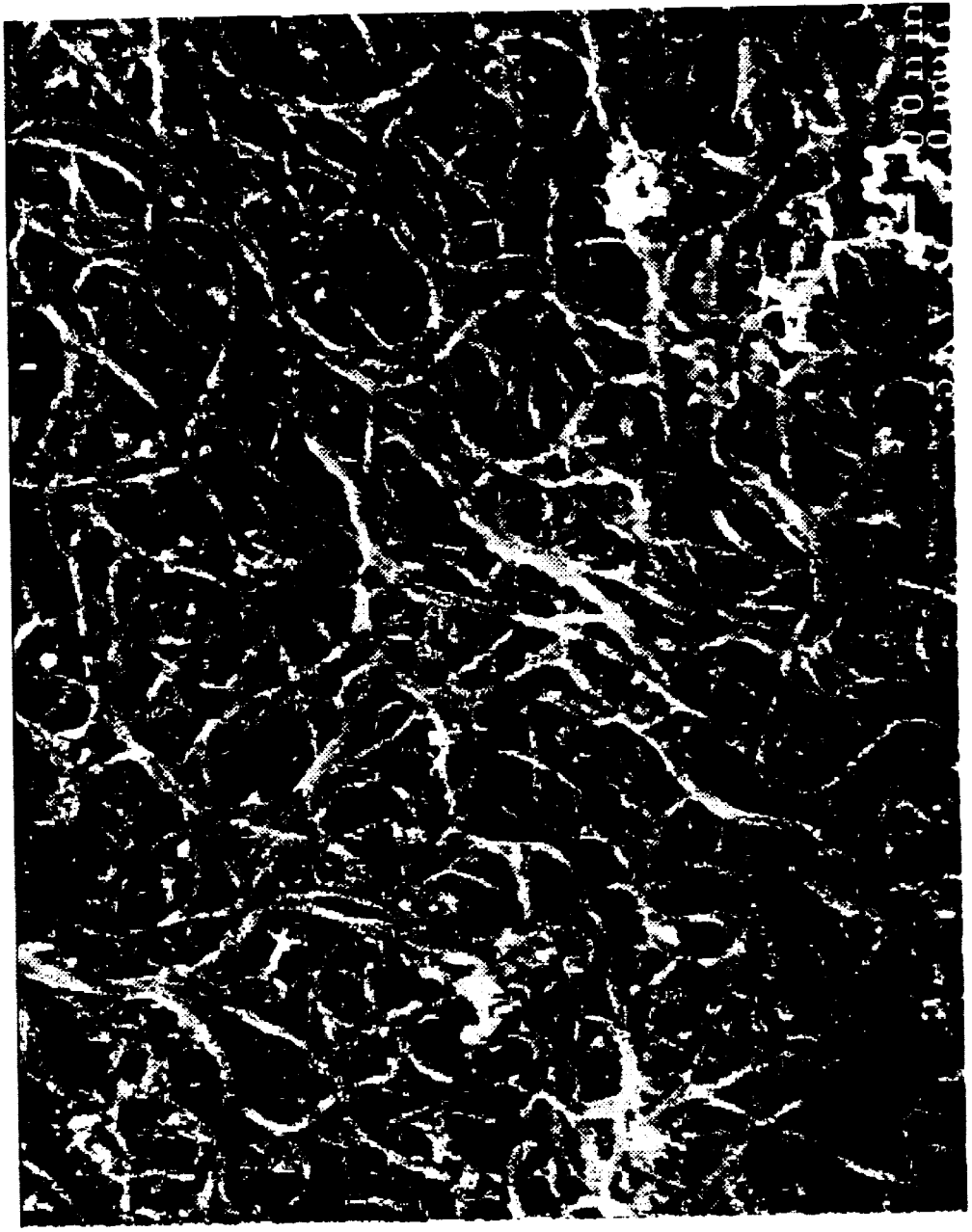
FIG. 9 shows a SEM image of purified SWNTs.

Single wall carbon nanotubes were produced by the dual pulsed laser vaporization of Co/Ni doped graphite rods and purified by methods discussed previously (Rinzler, et al., Appl. Phys.A, 1998, 67:9–37.). The SWNTs produced in this way are primarily (10,10) nanotubes. The purified product is a metastable colloidal suspension of SWNT "ropes" (bundles of tubes ranging from a few to 200 SWNTs, see Thess, et al., Science 1996, 273, 483–487) in a 0.2% aqueous solution of Triton™ X-100 surfactant. This was then filtered over a PTTE filter membrane (Sartorius, with 0.2 μm pore dimensions) and rinsed with methanol. Filtering this and rinsing with methanol leads to a final product which is a freestanding "mat" or "bucky paper" of SWNTs that is approximately 10 μm thick. Purity of the SWNTs was monitored via scanning electron microscopy (JEOL 6320F SEM). FIG. 9 shows a sample of typical purity. This product was then resuspended by sonication in dimethyl formamide (DMF; Fisher, HPLC grade). Such treatment is believed to "cut" the tubes at their defect sites and also seems to unravel the ropes somewhat, leading to bundles containing fewer SWNTs. This product was then filtered, rinsed and heated in an oven at 150° C. for 2 hours prior to fluorination. Sonication in DMF may result in smaller SWNT ropes and ultimately lead to a more efficient fluorination.

3.2 Preparation of fluorinated SWNTs

The purified nanotubes (5–10 mg in the form of bucky paper) were placed in a temperature controlled fluorination reactor constructed of Monel™ and nickel. After sufficient purging in He (Trigas 99.995%) at 250° C., fluorine (Air Products 98%, purified of HF by passing it over NaF pellets) was introduced. The fluorine flow was gradually increased to a flow rate of 2 sccm diluted in a He flow of 20 sccm. The fluorination was allowed to proceed for approximately 10 hours, at which point the reactor was brought to room temperature, and the fluorine flow was gradually lowered. After the fluorine flow was completely halted, the reactor was purged at room temperature for approximately 30 minutes before removing the fluorinated product. The fluorinated SWNTs consisted of approximately 70 atomic percent carbon and 30 atomic percent fluorine as determined by electron microprobe analysis (EMPA, Cameca SX-50). This fluorinated product was well characterized with Raman, IR, SEM, TEM, resistance measurements and x-ray photoelectron spectroscopy (Physical Electronics PHI 5700 XPS using soft monochromatic Al Kα (1486.7 eV) x-rays).

3.3 Solvation in alcohols

Attempts to solubilize fluorotubes with the "like dissolves like" approach of sonicating and heating them in perfluorinated solvents met with little success. Attempts were also made to solvate them in hydrogen bonding solvents. Recent studies on the hydrogen bonding capabilities of alkyl fluorides suggest that the fluorine in such species are poor hydrogen bond acceptors (Dunitz, et al., R, *Eur. J. Chem.*, 1997, 3(1):89–98; Howard, et al., *Tetrahedron*, 1996, 52(38):12613–12622). The F⁻ ion, however, is one of the best hydrogen bond acceptors available. The strength of the hydrogen bond formed between HF and F⁻ approximates that of a covalent bond (Harrell, et al., *JA CS* 1964, 86:4497). An XPS analysis of our fluorinated SWNT product reveals an F 1s peak at a binding energy of 687 eV. Polytetrafluoroethylene has an F 1s binding energy of 691.5 eV. This suggests that the fluorine bonded to the fluorotubes is considerably more ionic than the fluorine present in alkyl fluorides (see Watanabe, et al., *Graphite Fluorides*, Elsevier: Amsterdam, 1988; p.246). Thus, the increased ionic nature of the C—F bond in the fluorotubes may make the fluorine on it better hydrogen bond acceptors.

Sonication of the fluorinated SWNT material in alcohols was carried out by placing approximately 1 milligram of material into a vial containing approximately 10 mL of alcohol solvent and sonicating for approximately 10 minutes. Sonication was performed by partially immersing the capped vial in a Cole-Parmer ultrasonic cleaner (containing water) operating at 55 kHz. The solvated fluorotubes were then dispersed on a clean mica surface by means of a 3000 rpm rotary spinner (Headway Research, Inc.) and examined with atomic force microscopy (Digital Instruments Multimode SPM). The solvated fluorotubes were also analyzed with a Shimadzu model 1601PC UV-vis spectrometer using quartz cuvetts.

Fluorotubes were solvated by sonicating in alcohol solvents including: methanol, ethanol, 2,2,2-trifluoroethanol, 2-propanol, 2-butanol, n-pentanol, n-hexanol, cyclohexanol and n-heptanol. Sonicating the fluorotubes in alcohol solvents produced metastable solutions. These solutions were stable for a couple of days to over one week, depending on the concentration and solvent used. While typical sonication times were around 10 minutes, the heavier solvents (pentanol and up) required slightly longer sonication times m order to fully suspend the tubes. Of the solvents used, 2-propanol and 2-butanol seemed to solvate the fluorotubes the best with the solutions being stable for more than a week. The solubility limit of the solvated "fluorotubes" in 2-propanol is at least 0.1 mg/mL. This solution was stable for slightly less than a week with some particulate matter precipitating out after a few days. This suggests that pushing the solubility limit somewhat decreases the solution's stability or that a super saturated solution can exist for a shorter period of time. All of the other solutions were stable for at least a couple of days before the onset of precipitation. A likely scenario for such solvation would be hydrogen bonding between the alcohol's hydroxyl hydrogen and the nanotubebound fluorine (scheme 1). No evidence of alkoxy substitution (or evolution of HF) was observed.

Scheme 1

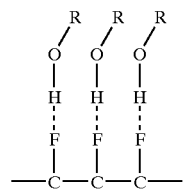

Efforts were also made to solvate the fluorotubes in other strong hydrogen bonding solvents like water, diethyl amine, acetic acid and chloroform. While water will not "wet" the fluorotube by itself, it will with the addition of a small amount of acetone. Still, even long sonication times in this water/acetone mixture failed to solvate the fluorotubes. Likewise, neither diethylamine nor acetic acid would solvate the fluorotubes. Chloroform solvated the tubes, but the solution was far less stable than those in alcohol solvents, with the fluorotubes falling out of solution in less than an hour.

Figure 10A:
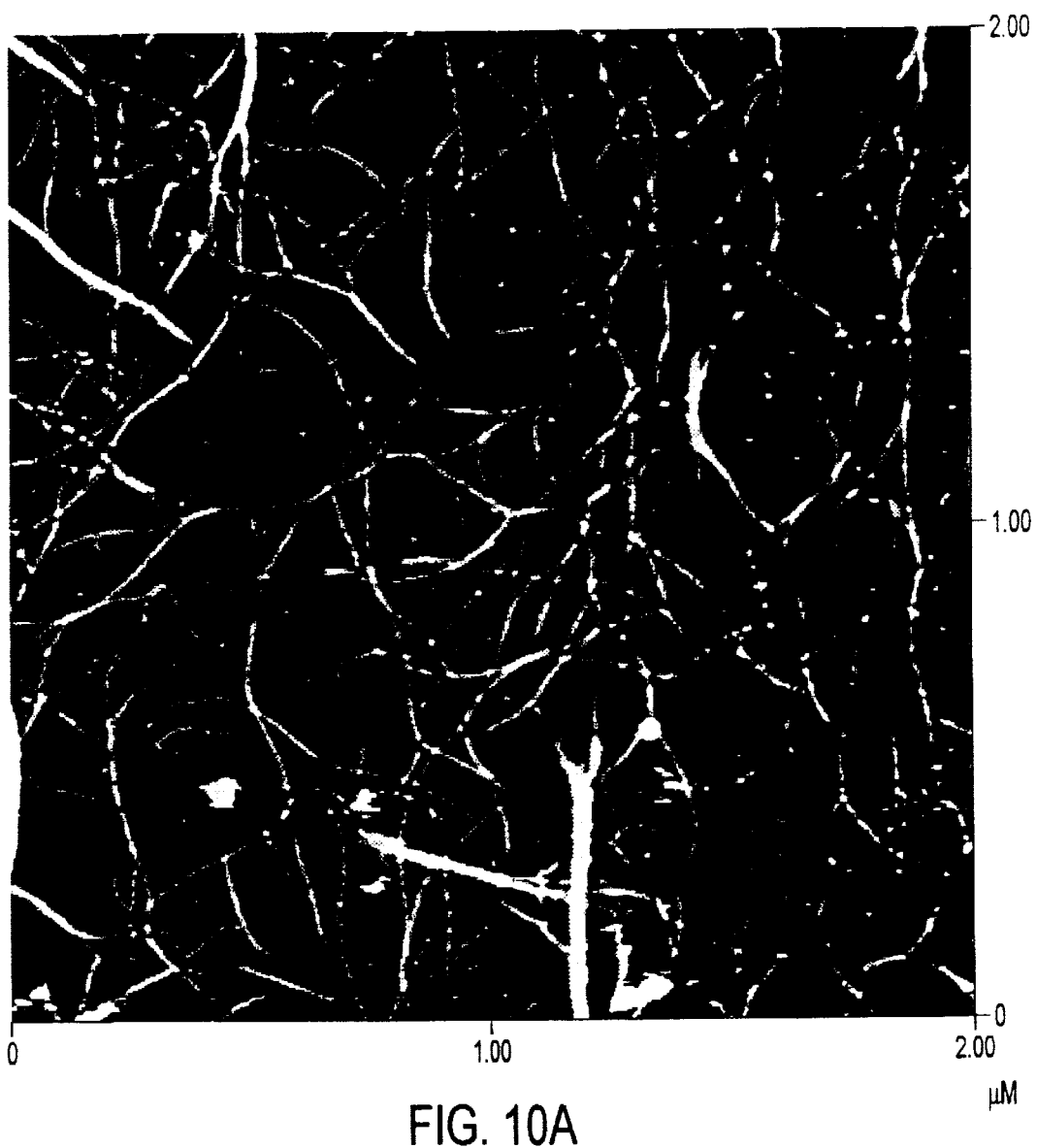
FIG. 10A shows an AFM image of fluorotubes which have been. dissolved in 2-butanol and dispersed on indica.
Figure 10B:
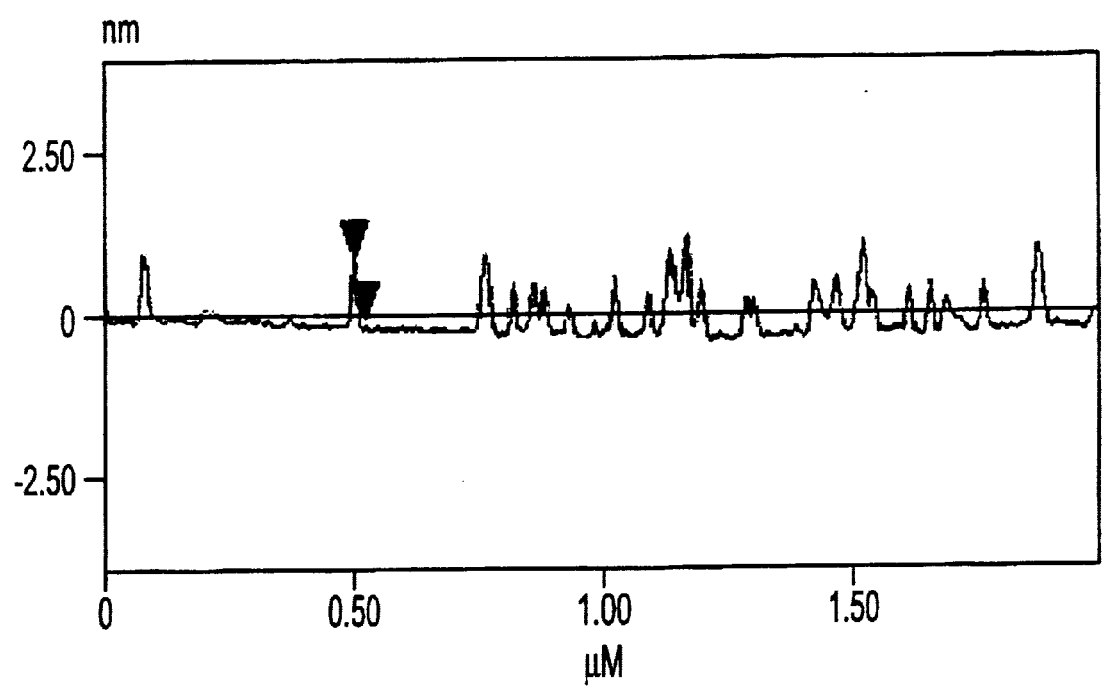
FIG. 10B shows a typical height analysis of the scan in FIG. 2A, revealing the tube diameters to be on the order of 1.2–1.4 nm, values on the order of those determined previously for this product using TEM and XRD.

The solvated fluorotubes were filtered over a 0.2 micron PTFE filter. Once dry, the fluorotubes could be peeled off the paper to form a freestanding film. This film was then examined by Raman spectroscopy (Jobin Yvon-Spex model HR 460 monochrometer coupled with an ISA Spectrum ONE series CCD detector and using 514.5 nm excitation from a Liconix Ar laser) and by EMPA to determine whether or not any reaction had taken place on the basis of the composition of the product. Fluorotubes from all of the solutions (except those in cyclohexanol, n-hexanol and n-heptanol) were examined with atomic force microscopy. FIG. 10 shows an AFM scan of fluorotubes that had been dissolved in 2-butanol and then dipersed on a clean mica surface. This result is fairly typical of all the fluorotube/alcohol solutions that were examined with AFM. Almost all the tubes are believed to be solvated, as few "ropes" (bundles of tubes) are present.

Some of these solutions were examined with $^{19}$F-NMR, but this proved to be rather uninformative. It yielded a broad peak centered at around −175 ppm. While this is indicative of fluorine being present, the broadening is due to either a wide variety of F environments (as seen in the inhomogeneous fluorination of $C_{60}$, Kniaz, et al., *J. Am. Chem. Soc.*, 1993, 115:6060–6064) or of insufficient "tumbling" while in solution. No information regarding the possible hydrogen bonding environments could be obtained with this method.

Figure 11:
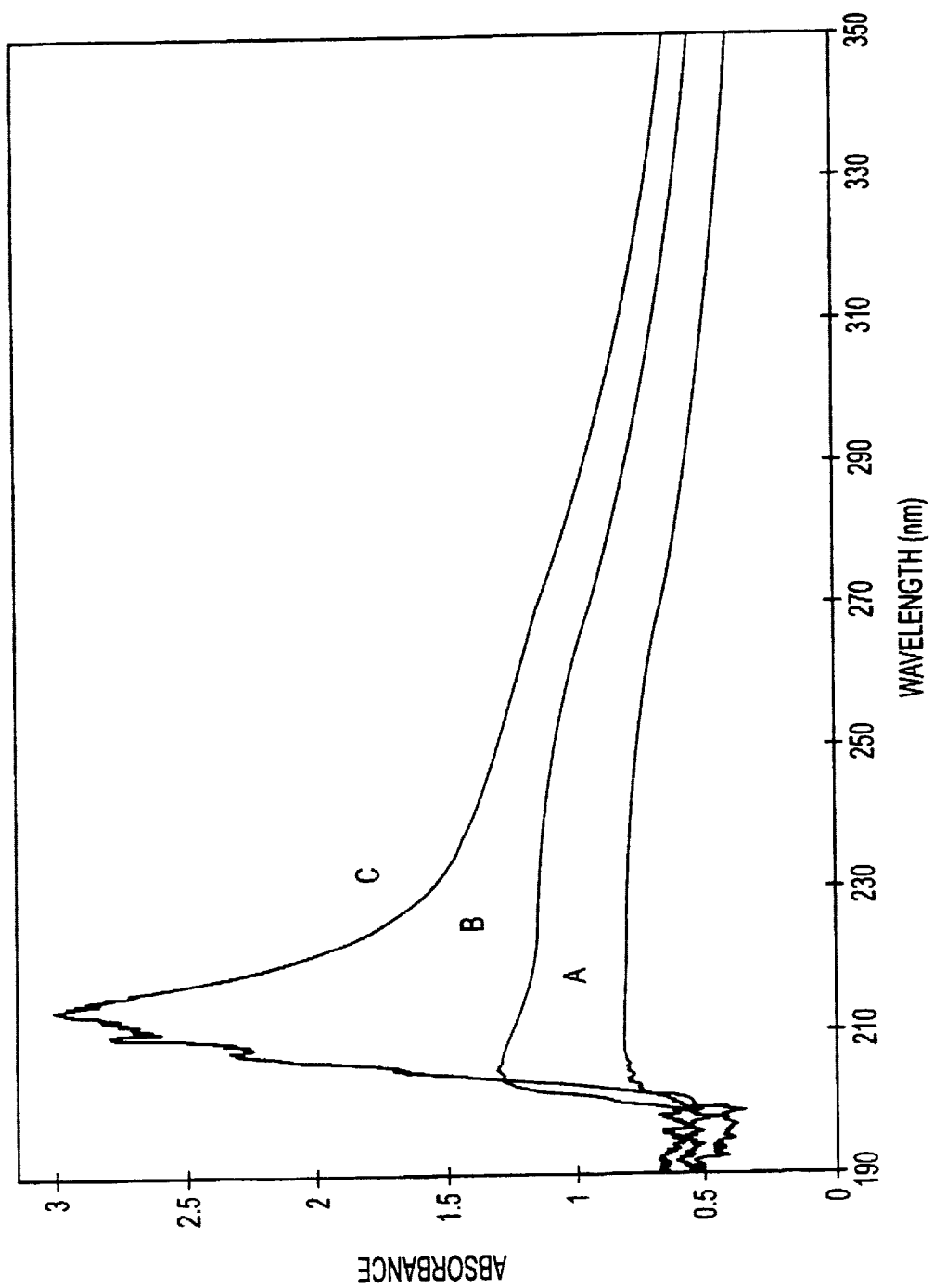
FIG. 11 shows a UV spectrum of fluorotubes solvated in 2-propanol after sonication times of A) 10 min. B) 40 min. and C 130 min.

Filtering a solution of fluorotubes in isopropyl alcohol over a PTFE filter and examining the tubes with EMPA revealed no presence of oxygen and only slightly lower fluorine levels (C/F atomic percent ratio=72/28 compared with 70/30 for the starting material). This would suggest that the solvation process is not the result of a chemical reaction, but is instead the result of hydrogen bonding between the alcohol and the fluorines on the nanotube surface. Analysis of fluorotubes sonicated for much longer times (2 hours) showed reduced levels of fluorine (C/F atomic percent ratio=76/24), yet they remained solvated. Apparently, ultrasonication can lead to removal of some of the fluorine if allowed to progress long enough. The fluorotubes were sonicated continuously in isopropanol and monitored with UV-vis absorption spectroscopy for sonication time t=10 minutes and every 30 minutes after that. After sonication for 40 minutes the solution exhibited an absorption band at 204 nm. This band continued to grow and to red shift to lower energy as the sonication proceeded and fluorine was presumably being eliminated. After sonicating for 130 minutes the peak had increased in intensity and shifted to 237 nm (FIG. 11).

3.4 Reactions in Solution

The present inventors shown that hydrazine acts as a effective defluorinating agent. Anhydrous hydrazine (Aldrich, 98%) was added to the solvated fluorotubes. The reaction mixture was continually stirred with a glass stir bar for a period of about an hour. The reaction mixture was filtered, rinsed with methanol and allowed to dry. This product was then examined with EMPA and Raman spectroscopy. It was also suspended in dimethyl formamide, dispersed on a mica surface and examined with AFM. The instruments and procedures were as above.

Figure 12A:
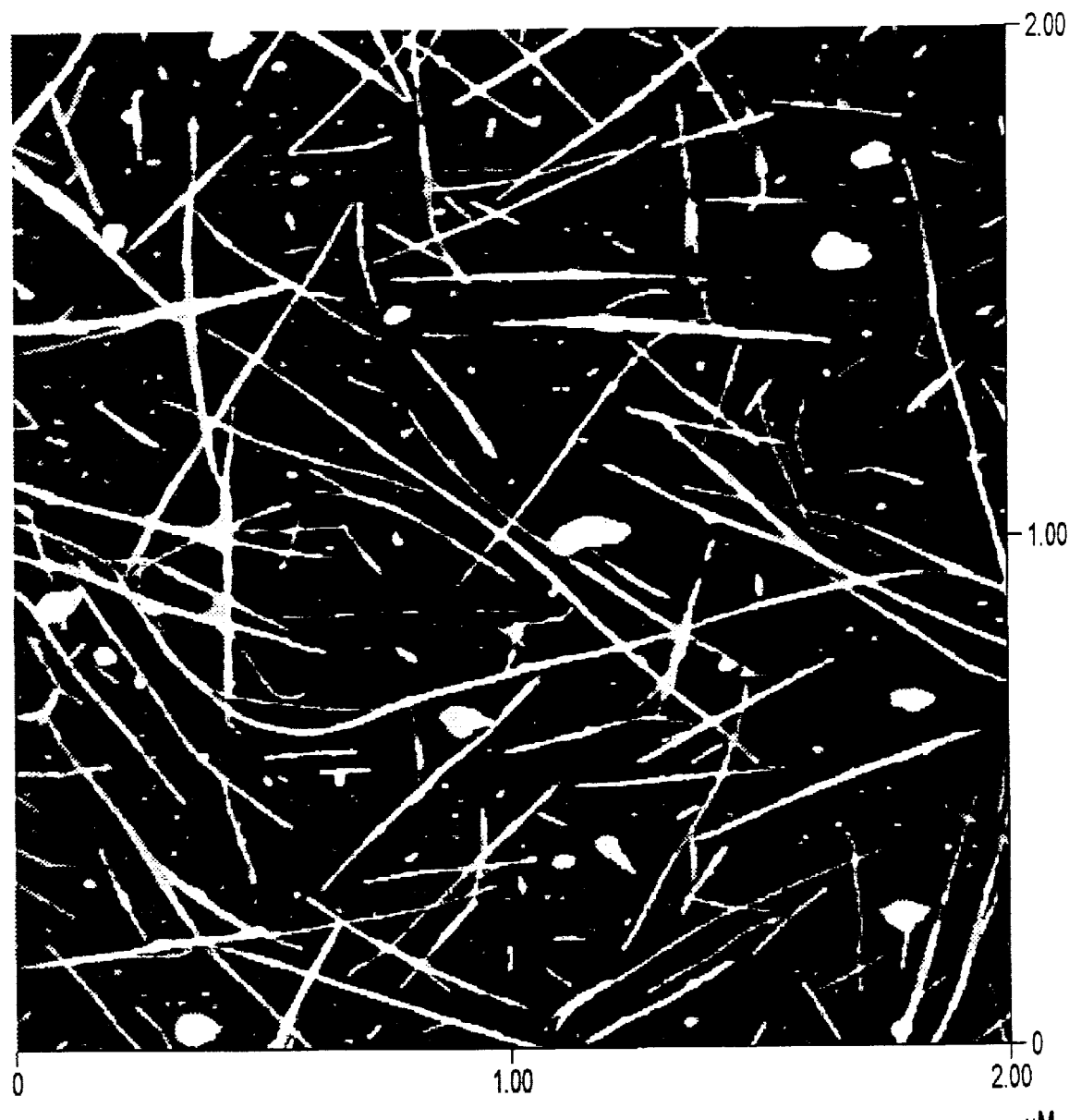
FIG. 12A shows an AFM image of fluorotubes after having been defluorinated with $N_2H_4$, filtered, resuspended in DMF and dispersed on mica.
Figure 12B:
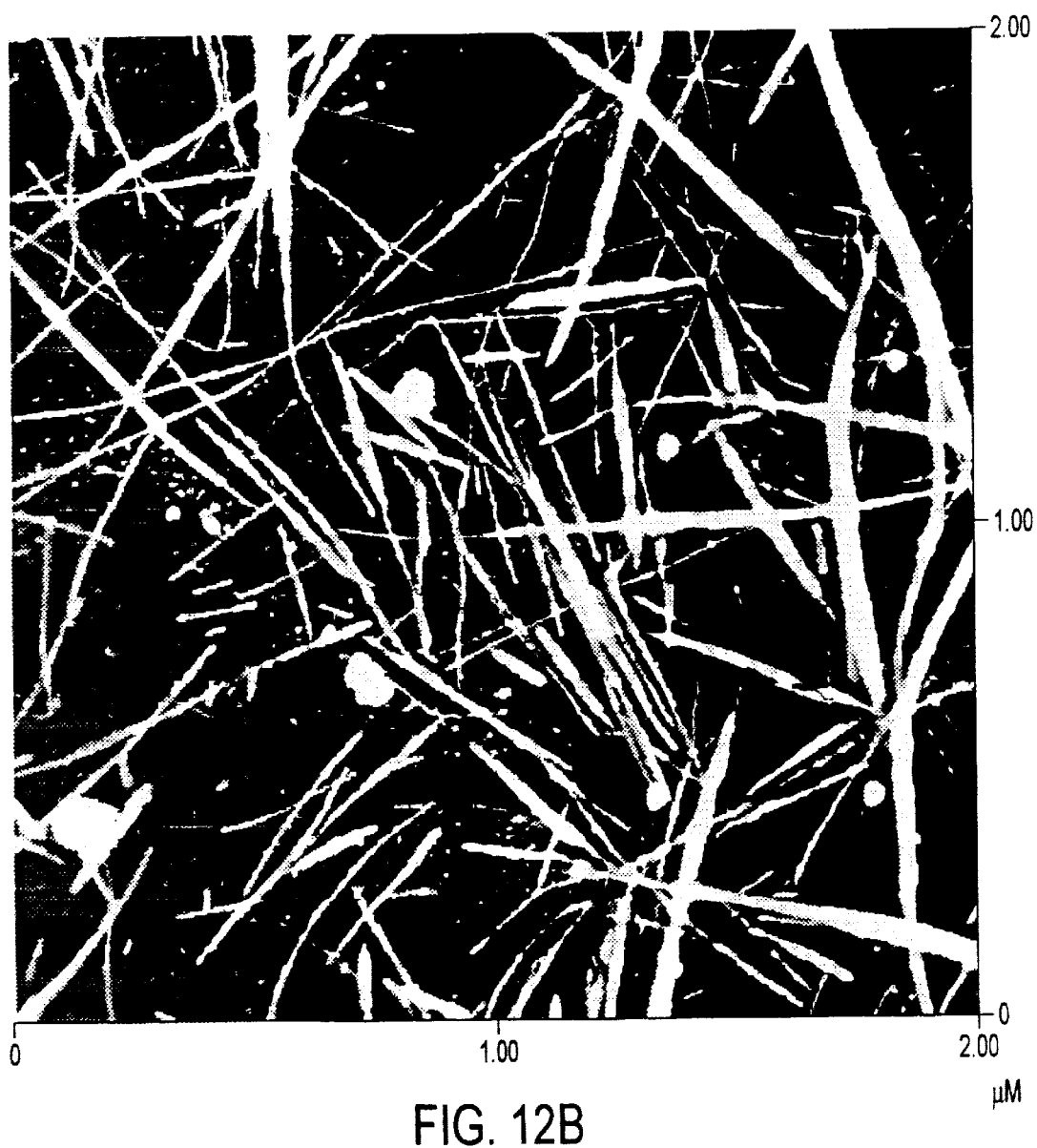
FIG. 12B shows an AFM image of untreated SWNTs dispersed on mica.

Adding anhydrous hydrazine to a solution of fluorotubes in isopropanol caused them to immediately precipitate out of solution. Filtering the solution after letting it sit for an hour yielded a product of very low fluorine content, as determined by EMPA (C/F atomic percent ratio=93/7). Unreacted SWNTs are known to suspend fairly well in DMF. Suspending this product in DMF and dispersing it on a mica surface followed by AFM analysis yielded tubes very reminiscent of the starting material (FIGS. 12, *a* & *b*).

Figure 13A:
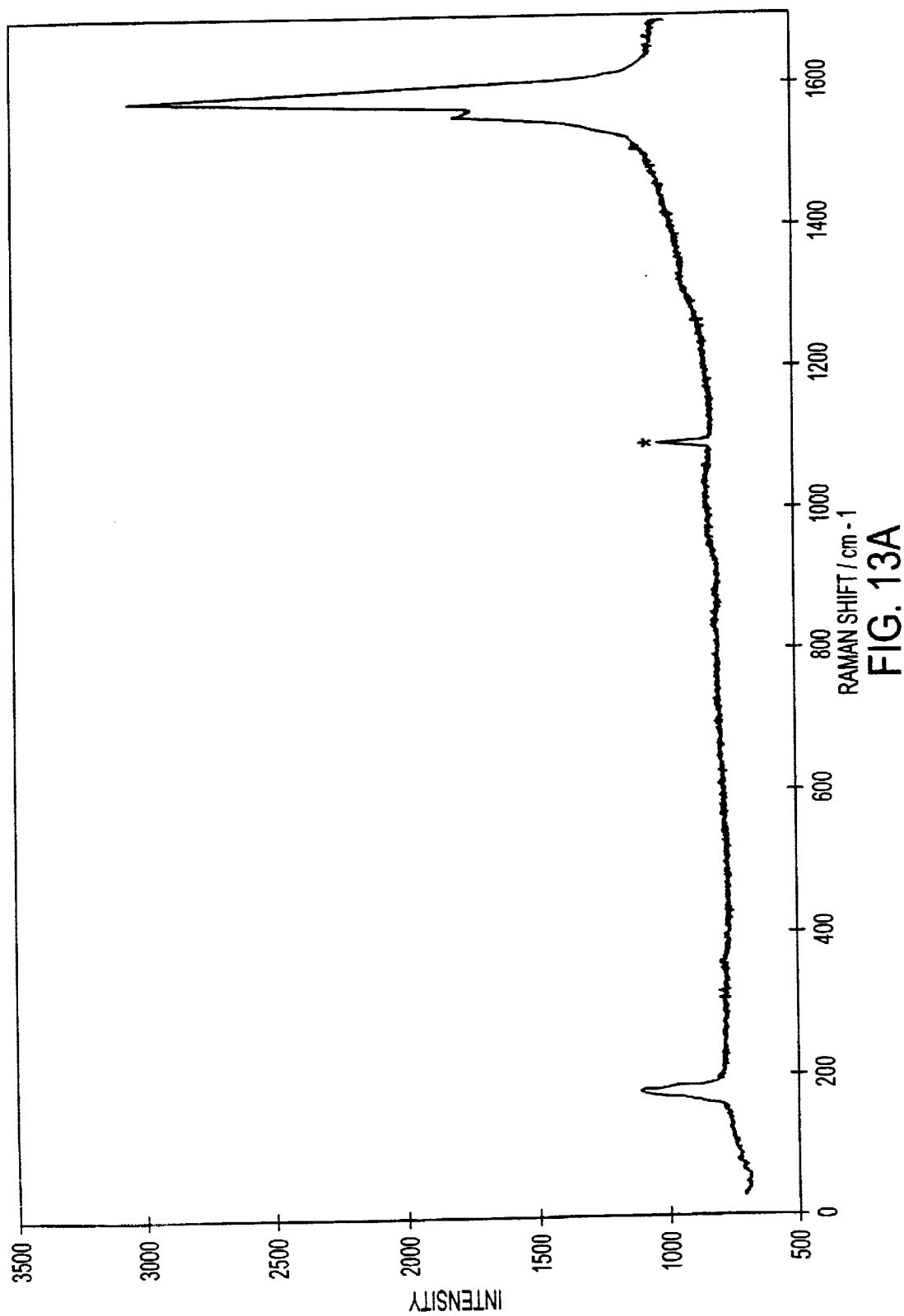
FIG. 13A shows a Raman spectrum of pure, untreated SWNTs.
Figure 13B:
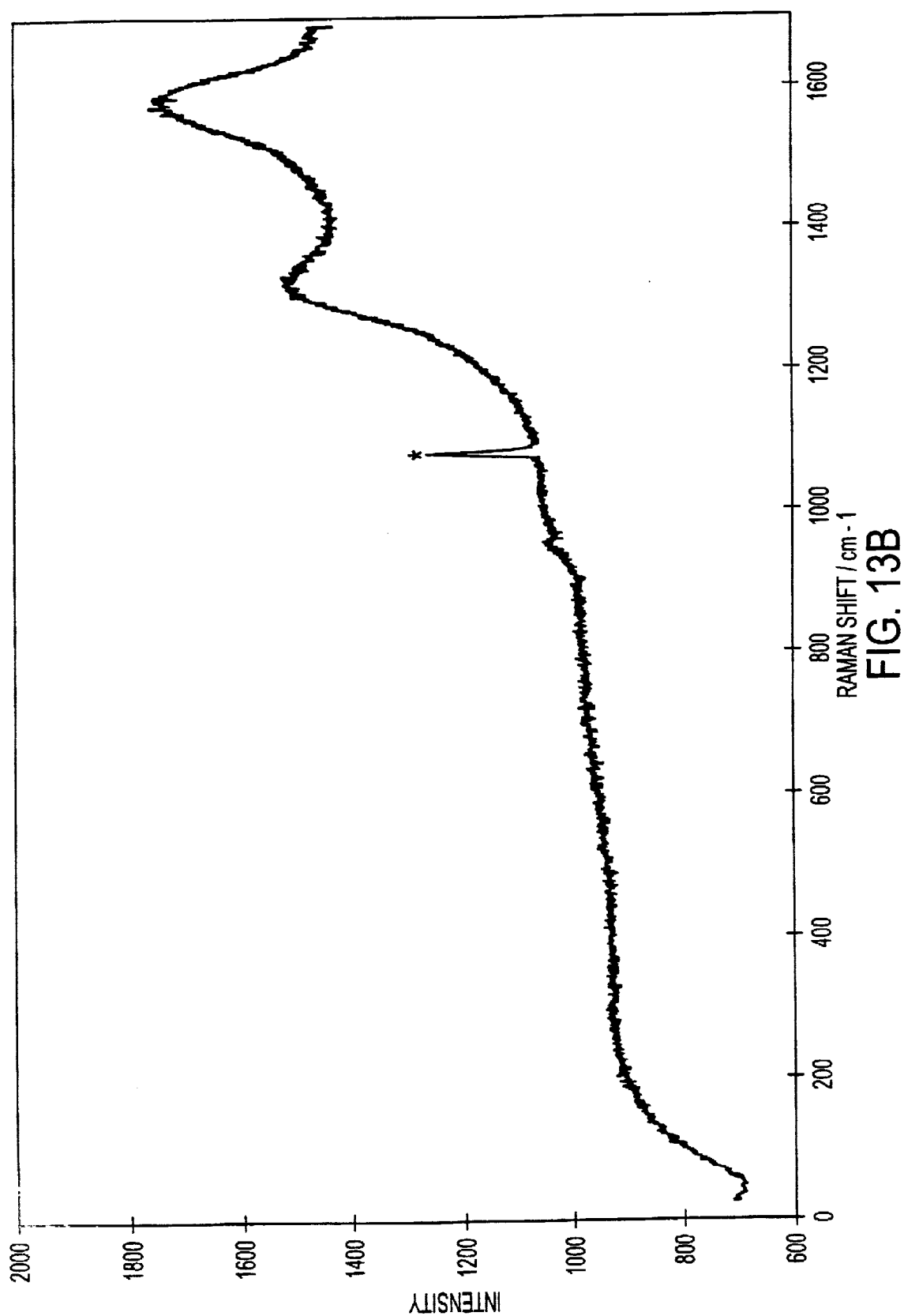
FIG. 13B shows a Raman spectrum of fluorotubes.
Figure 13C:
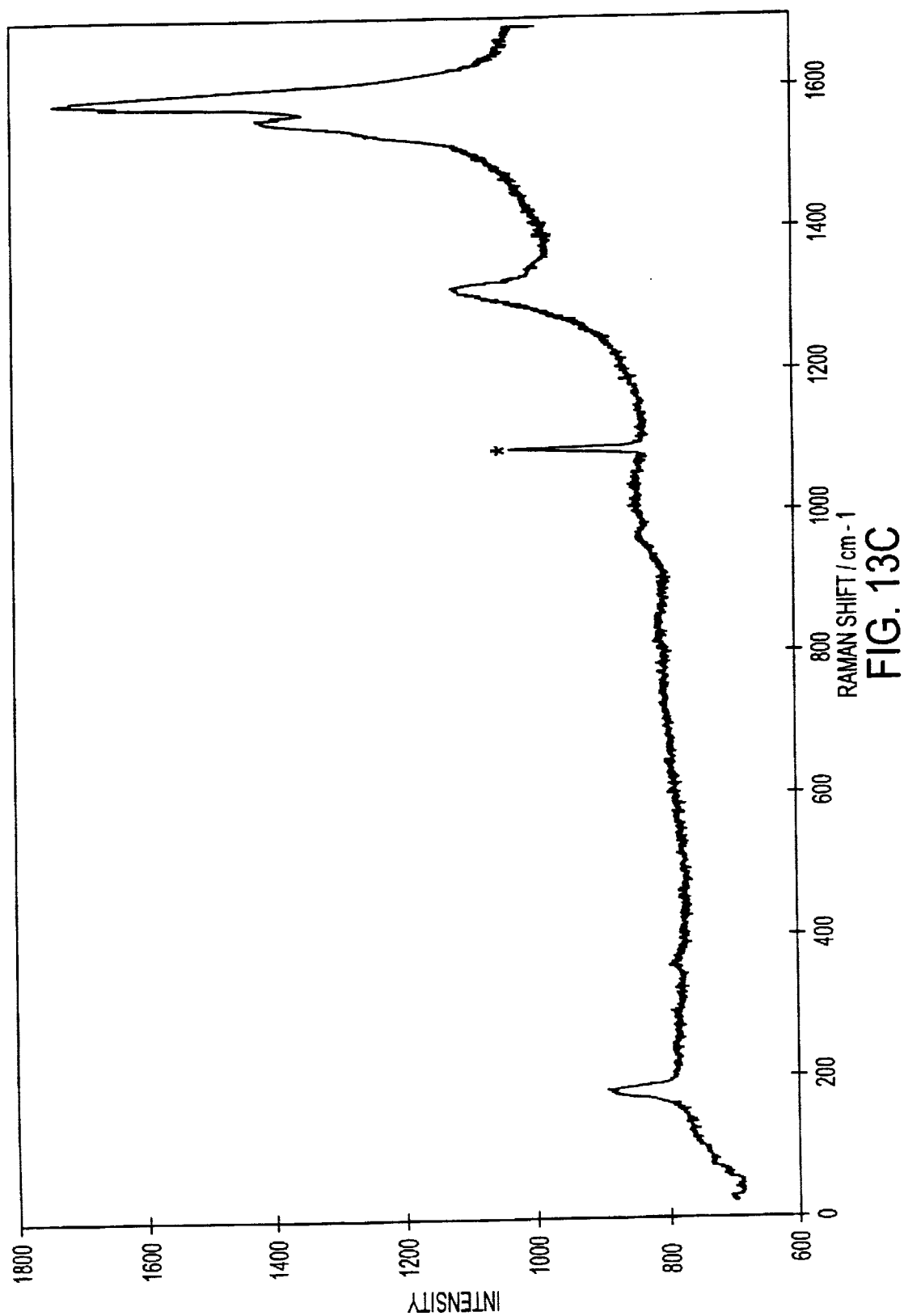
FIG. 13C shows a Raman spectrum of fluorotubes after having been defluorinated with $N_2H_4$. * denotes Ar plasma line.

Raman spectroscopy of SWNTs has been well established (Richter, E., et al., *Phys. Rev. Lett.*, 1997, 79(14):2738–2741; Rao, et al., *Science*, 1997, 275:187–191; Fang, et al.,*J. Mat. Res.*, 1998, 13:2405–2411), and it was used as a probe to follow the starting material through the fluorination, sonication and defluorination. Raman spectroscopy on the hydrazine-defluorinated product yields a spectrum similar to the starting material and very different from the fluorinated SWNTs (FIGS. 13; *ab* & *c*).

Fluorotubes were also sonicated in a 0.5 M sodium methoxide in methanol solution (Aldrich, A.C.S. reagent) for approximately 10 minutes. The tubes broke up and appeared to be suspended but quickly fell out of solution upon standing. This too was filtered, rinsed and examined with EMPA and EI mass spectroscopy (Finnigan MAT 95)

Sonication of the fluorotubes in a sodium methoxide in methanol solution for two hours resulted in the tubes precipitating out of solution. After the filtered product was rinsed with water (to remove NaF) and methanol, then dried in an oven at 140° C. for half an hour, it was analyzed with EMPA which revealed the C/F/O relative atomic percents to be 79/17/4. This varies considerably from the starting material which had C/F/O relative atomic percents of 66/33.7/0.3 and suggests a product stoichiometry of $C_{4.4}F(OCH_3)_{0.25}$. Pyrolysis of this product with a high temperature probe inside a mass spectrometer, followed by electron ionization, yielded significant quantities of methoxy ions (m/z=31) coming off primarily at 650–700° C. as determined by the residual ion current trace. The high temperature for evolution indicates that the methoxy groups seen were originally strongly bonded to the nanotube. If the oxygen ratios seen by EMPA are reflective of the number of methoxy groups present on the nanotube, it may be concluded that the majority of these would have to be bonded to the nanotube side wall, based on the fact that the number of nanotube end carbons is extremely small relative to the number of side wall carbons.

Nucleophilic attack on the fluorinated nanotube by a methoxy anion is a plausible scenario as nucleophilic attack of this type has been well documented in the case of fluorinated fullerenes (Mickelson, et al., *J Fluorine Chem* 1998, 92(1):59–62; Taylor, et al., *J. Chem. Soc., Chem. Commun.* 1992,665–667). The C—F bonds on fluorinated fullerenes (and carbon nanotubes) are weakened relative to the C—F bonds in alkyl fluorides due to an "eclipsing strain effect" (Taylor, R,. *Russian Chemical Bulletin, Engi. Ed.* 1998, 47(5):823–832). A nucleophilic attack of this type is likely to occur via attack on an electropositive carbon beta to a carbon with fluorine attached to it as shown in scheme 2. This is rationalized by the fact that an $S_N1$ type substitution is energetically unfavorable and backside attack, as in an $S_N2$ type mechanism, is impossible (Taylor, R *The Chemistry of the Fullerenes* (Edited by R. Taylor), World Scientific Publishing, London, 1995; pp.208–209).

Scheme 2

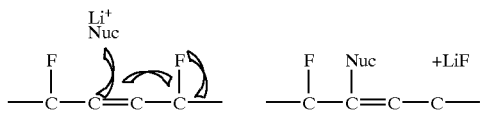

Molecular Arrays of Single-wall Carbon Nanotubes

Figure 14:
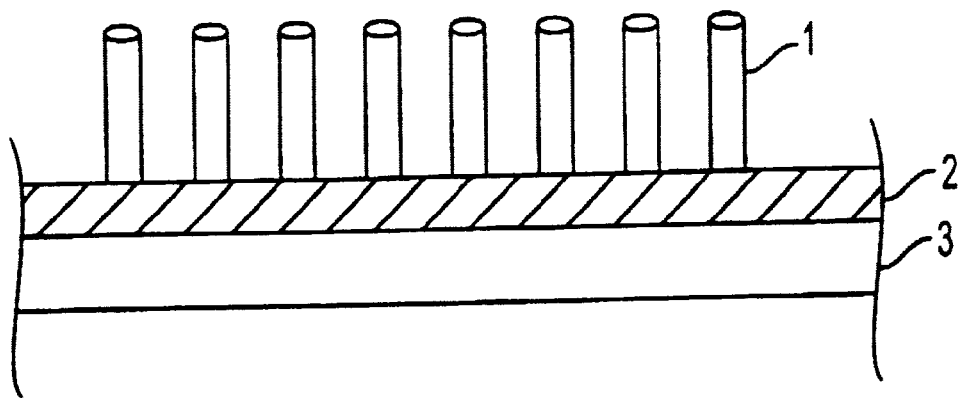
FIG. 14 is a schematic representation of a portion of an homogeneous SWNT molecular array according to the present invention.

An application of particular interest for a homogeneous population of SWNT molecules is production of a substantially two-dimensional array made up of single-walled nanotubes aggregating (e.g., by van der Waals forces) in substantially parallel orientation to form a monolayer extending in directions substantially perpendicular to the orientation of the individual nanotubes. Formation of such arrays is substantially enabled by derivatization of both the ends and side walls of nanotubes as is indicated below. Such monolayer arrays can be formed by conventional techniques employing "self-assembled monolayers" (SAM) or Langmiur-Blodgett films, see Hirch, pp. 75–76. Such a molecular array is illustrated schematically in FIG. 14. In this figure, derivatized nanotubes 1 are bound via interaction of the linking or complexing moiety attached to the nanotube to a substrate 2 having a reactive coating 3 (e.g., gold). Sidewall derivatization in this application can facilitate assembly of the array by enabling the tubes to move effectively together as the array assembles.

Figure 15:
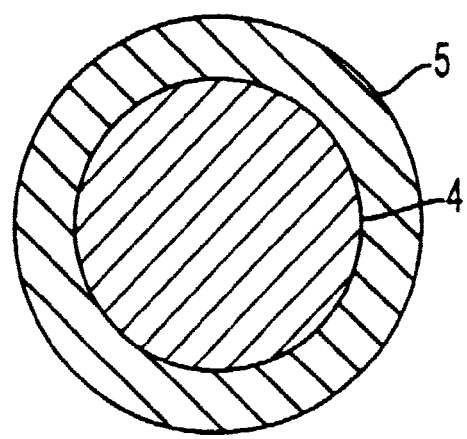
FIG. 15 is a schematic representation of an heterogeneous SWNT molecular array according to the present invention.

Typically, SAMs are created on a substrate which can be a metal (such as gold, mercury or ITO (indium-tin-oxide)). The molecules of interest, here the SWNT molecules, are linked (usually covalently) to the substrate through a linker moiety such as —S—, —S—$(CH_2)_n$—NH—, —$SiO_3(CH_2)_3$NH— or the like. The linker moiety may be bound first to the substrate layer or first to the SWNT molecule (at an open or closed end) to provide for reactive self-assembly. Langmiur-Blodgett films are formed at the interface between two phases, e.g., a hydrocarbon (e.g., benzene or toluene) and water. Orientation in the film is achieved by employing molecules or linkers that have hydrophilic and lipophilic moieties at opposite ends. The configuration of the SWNT molecular array may be homogenous or heterogeneous depending on the use to which it will be put. Using, SWNT molecules of the same type and structure provides a homogeneous array of the type shown in FIG. 14. By using different SWNT molecules, either a random or ordered heterogeneous structure can be produced. An example of an ordered heterogeneous array is shown in FIG. 15 where tubes 4 are (n,n), i.e., metallic in structure and tubes 5 are (m,n), i.e., insulating. This configuration can be achieved by employing successive reactions after removal of previously masked areas of the reactive substrate.

Arrays containing from $10^3$ up to $10^{10}$ and more SWNT molecules in substantially parallel relationships can be used per se as a nanoporous conductive molecular membrane, e.g., for use in fuel cells and in batteries such as the lithium ion battery. This membrane can also be used (with or without attachment of a photoactive molecule such as cis-(bisthiacyanato bis (4,4'dicarboxy-2–2'-bipyridine Ru (II)) to produce a highly efficient photo cell of the type shown in U.S. Pat. 5,084,365.

One preferred use of the SWNT molecular arrays of the present invention is to provide a "seed" or template for growth of macroscopic carbon fiber of single-wall carbon nanotubes as described below. The use of a macroscopic cross section in this template is particularly useful for keeping the live (open) end of the nanotubes exposed to feedstock during growth of the fiber. The template array of this invention can be used as formed on the original substrate, cleaved from its original substrate and used with no substrate (the van der Waals forces will hold it together) or transferred to a second substrate more suitable for the conditions of fiber growth.

Where the SWNT molecular array is to be used as a seed or template for growing macroscopic carbon fiber as described below, the array need not be formed as a substantially two-dimensional array. The "seed" array can, for instance, be the end of a fiber of parallel nanotubes in van der Walls contact that has been cut, or a short segment of such a fiber that has been cut from the fiber. For such substrates the surface comprising the ends of must be prepared to be clean and flat by polishing and/or electrochemical etching to achieve a clean, highly planar surface of exposed nanotube ends. Any form of array that presents at its upper surface a two-dimensional array can be employed. In the preferred embodiment, the template molecular array is a manipulatable length of macroscopic carbon fiber as produced below.

Large arrays (i.e., >$10^6$ tubes) also can be assembled using nanoprobes by combining smaller arrays or by folding linear collections of tubes and/or ropes over (i.e., one folding of a collection of n tubes results in a bundle with 2n tubes).

Growth of Nanotubes from "Seeds"

The present invention provides methods for growing continuous carbon fiber from SWNT molecular arrays to any desired length. The carbon fiber which comprises an aggregation of substantially parallel carbon nanotubes may be produced according to this invention by growth (elongation) of a suitable seed molecular array. As used herein, the term "macroscopic carbon fiber" refers to fibers having a diameter large enough to be physically manipulated, typically greater than about 1 micron and preferably greater than about 10 microns.

It is well known that SWNT formation occurs at temperatures between 500 and 2000° C. in which a catalytic particle comprising group VI B or VIII B Btransition metals (individually or as a mixture) resides at the end of a "growing" SWNT. The catalytic particle interacts with a carbon-bearing feedstock to promote chemical processes by which carbon in the feedstock is converted into carbon organized in the structure known as a SWNT. Once a SWNT of a specific geometry (chirality and diameter) begins to grow, the tube geometry remains fixed. The catalytic tube-growth process is most effectively promoted by catalyst particles of an appropriate size range and chemical composition. Examples in the art indicate that the most effective catalyst particles have diameters approximately equal to those of the growing nanotubes, and that they comprise a single metal or a mixture of metals. An objective of this invention is to provide processes by which a suitable catalyst particle may be formed at the end of an existing SWNT, enabling growth of that tube to be initiated upon introduction of the tube/catalyst-particle assembly to an appropriate environment.

To achieve the objective, the invention provides methods for assembling catalyst particles on the ends of individual fullerene single-wall nanotubes (SWNT) in a way that supports further growth of the SWNT. Deliberate initiation of SWNT growth from such "seed" tubes is useful in that:

1) it can act to produce nanotubes that have the same geometry as the "seed" tubes. [It is well known that fullerene single wall nanotubes (SWNT) may be formed with different geometries (different diameters and arrangements of carbon atoms with respect to the tube axis), and that the physical properties (e.g., electrical conductivity) of these tubes generally depend on these geometries]. Control of the tube geometry permits growth of SWNT for applications that require specific material properties.

2) It can serve as an enabling process in bulk production of nanotubes;

3) It can enable growth of ordered structures of SWNT that have been assembled by other means (e.g., suitable arrays can be formed by conventional techniques employing "self-assembled monolayers" (SAM) or Langmiur-Blodgett films, see Hirch, pp. 75–76.

4) It can be used to grow structural shapes of SWNT material comprising parallel nanotubes all in van der Waals contact. These materials can have the forms of sheets, I-beams, channels, etc. by appropriately configuring the seed in the shape of the cross section of the desired structural object.

To achieve the objectives and provide the benefits of growth from "seeds," the present invention provides:

1) A measured amount of a transition-metal-containing species is chemically attached (by covalent bonding, chemisorption, physisorption or combination thereof) to the sidewall of an individual SWNT segment or to the sidewalls of a group of SWNT segments. A preferred embodiment is one in which the metal is contained as a compound that is stable to exposure to moisture and air. The amount of metal attached to the SWNT segment is determined by the degree of derivatization, which is defined herein as the number of derivative sites per nanometer of tube length. In this invention, the preferred degree of derivatization is approximately 1 per nanometer, and the preferred method of derivatization is covalent bonding of a species that contains a metal atom. Alternatively, the transition metal may be deposited directly on the surface from metal vapor introduced onto the open tube ends of the "seed".

2) Chemical or physical processing of the metal or metal-containing species in a way that allows metal atoms to aggregate at or near the end of the tube segment so that the aggregate is a suitable catalyst for enabling growth of the tube when the tube/catalyst assembly is introduced to an appropriate environment.

3) Growth of nanotubes of specific geometries (chirality and diameter) by choosing the diameter and chirality of the "seed" tube.

4) Growth of organized structures of SWNT (e.g., arrays of tubes with specific relative spacing and orientation of individual tubes, membranes of tubes comprising many parallel tubes closely packed together, and rods or fibers of tubes with parallel axes) in which an initial structure has been assembled by other means, which include the operation of molecule agencies attached to the sidewalls of the SWNTs forming the structure, and the novel compositions of matter so produced.

5) Growth of organized structures of SWNT (as 4 above) in which the SWNT all have the same geometry (chirality and diameter) and the composition of matter so produced.

6) Growth of organized structures of SWNT (as 4 above) in which the SWNT all have a range of geometries chosen to perform a specific function (e.g., a core of tubes of conducting geometry surrounded by tubes of large-gap semiconducting geometry to effect a small "insulated wire") and the structures so produced.

7) Production of "monoclonal" batches of tubes that all have precisely the same geometry because they all are grown from segments of a single tube which has been cut by known techniques and the compositions of matter so produced.

The present invention is further exemplified by the following:

a) A process in which one cuts segments of SWNT of 0.1 to 1 micron length by, for instance, sonicating the SWNT material in dimethylformamide, selects tube segments of a specific range of length and covalently bonds a chelating agent such as ethylene to the tube wall. These binding sites are sufficiently spaced from one another that the number of chelating agent molecules is roughly equivalent to the number of metal atoms needed to form an active catalyst cluster at the end of the tube segment. Covalent bonding of various species is described herein, via replacement reactions upon a small fraction of the derivatized sites on fluorinated tubes. A chelating agent is reacted with a fluorinated SWNT so that the chelating agent replaces fluorine on the nanotube, followed by washing the derivatized nanotube with a weak solution of metal ions in water (e.g., $Fe^{3+}$). The interaction of the Fe and water with the chelating agent will form a complex on the tube surface that is stable under exposure to air and water. The tube material can be heated in a reducing atmosphere (such as $H_2$). This heating will cause the chelating agent to react by converting to gaseous products, leaving Fe adsorbed on the tube wall, and at appropriate temperatures the Fe will migrate along the tube walls. The tube end presents an irregularity of the surface upon which the Fe is migrating, and the Fe will preferentially collect there as an aggregate suitable for functioning as a catalyst particle for tube growth.

b) Approaches similar to a) above, but including more complex, multidentate ligands such as ethydiamine tetra-acetic acid (EDTA) or bipyridine tethered to the side of the SWNT by a covalent linkage or simpler species such as a carboxylate or OH group.

c) Another means for assembly of a catalytic particle at the end of an SWNT segment involves reaction processes in which chelating agents, other ligands, or metal containing species themselves, are chemically attached to the tube ends (both open and closed). As described above, the tube ends are more active sites and support a broader range of chemical processes than the tube sidewalls. Both ion-exchange and covalent attachment of metal-bearing proteins (e.g. metallothionein) or metal-bearing complexes are possible examples. One can, for example, exchange the metal atoms for the carboxylic acid groups known to exist at the ends of tubes, directly attached metal bearing proteins or other metal-containing species with the tube ends. If necessary further processes can enable deposition of additional metal at the ends of the tube segments. The amount of metal is simply determined by the usual methods of control of the reagent concentrations, temperatures, and reaction times. Here, again, aggregates of metal atoms of the appropriate size are formed at the end of selected SWNT segments, and can serve as catalysts for tube growth under the appropriate conditions.

d) Formation of arrays of SWNT wherein the array formation is enabled and controlled by species attached to the tube sidewalls. This species that enables array formation may be attached to the tube by covalent bonding, chemisorption, adsorption, or a combination thereof. This aspect of this invention:

i) enables and controls organization of SWNT segments into organized structures and ii) admits metal-containing species or metal atoms or ions to the tube sidewalls in a way that under appropriate chemical processing the metal particles may migrate to the tube ends and form catalysts for further SWNT growth.

The first step in the growth process is to open the growth end of the SWNTs in the molecular array. This can be accomplished as described above with an oxidative and/or electrochemical treatment. Next, a transition metal catalyst is added to the open-ended seed array. The transition metal catalyst can be any transition metal that will cause conversion of the carbon-containing feedstock described below into highly mobile carbon radicals that can rearrange at the growing edge to the favored hexagon structure. Suitable materials include transition metals, and particularly the Group VI B or VIII B transition metals, i.e., chromium (Cr), molybdenum (Mo), tungsten (W), iron (Fe), cobalt (Co), nickel (NI), ruthenium (Ru), rhodium (Rh), palladium (Pd), osmium (Os), iridium (Ir) and platinum (Pt). Metals from the lanthanide and actinide series may also be used. Preferred are Fe, Ni, Co and mixtures thereof. Most preferred is a 50/50 mixture (by weight) of Ni and Co.

The catalyst should be present on the open SWNT ends as a metal cluster containing from about 10 metal atoms up to about 200 metal atoms (depending on the SWNT molecule diameter). Typically, the reaction proceeds most efficiently if the catalyst metal cluster sits on top of the open tube and does not bridge over adjacent tubes. Preferred are metal clusters having a cross-section equal to from about 0.5 to about 1.0 times the tube diameter (eg., about 0.7 to 1.5 nm).

In the preferred process, the catalyst is formed, in situ, on the open tube ends of the molecular array by a vacuum deposition process. Any suitable equipment, such as that used in Molecular Beam Epitaxy (MBE) deposition, can be employed. One such device is a Küdsen Effusion Source Evaporator. It is also possible to effect sufficient deposition of metal by simply heating a wire in the vicinity of the tube ends (e.g., a Ni/CO wire or separate Ni and CO wires) to a temperature below the melting point at which enough atoms evaporate from one wire surface (e.g., from about 900 to about 1300° C.). The deposition is preferably carried out in a vacuum with prior outgassing. Vacuums of about $10^{-6}$ to $10^{-8}$ Torr are suitable. The evaporation temperature should be high enough to evaporate the metal catalyst. Typically, temperatures in the range of 1500 to 2000° C. are suitable for the Ni/Co catalyst of the preferred embodiment. In the evaporation process, the metal is typically deposited as monolayers of metal atoms. From about 1–10 monolayers will generally give the required amount of catalyst. The deposition of transition metal clusters on the open tube tops can also be accomplished by laser vaporization of metal targets in a catalyst deposition zone.

The actual catalyst metal cluster formation at the open tube ends is carried out by heating the tube ends to a temperature high enough to provide sufficient species mobility to permit the metal atoms to find the open ends and assemble into clusters, but not so high as to effect closure of the tube ends. Typically, temperatures of up to about 500° C. are suitable. Temperatures in the range of about 400–500° C. are preferred for the Ni/Co catalysts system of one preferred embodiment.

In a preferred embodiment, the catalyst metal cluster is deposited on the open nanotube end by a docking process that insures optimum location for the subsequent growth reaction. In this process, the metal atoms are supplied as described above, but the conditions are modified to provide reductive conditions, e.g., at 800° C., 10 millitorr of $H_2$ for 1 to 10 minutes. There conditions cause the metal atom clusters to migrate through the system in search of a reactive site. During the reductive heating the catalyst material will ultimately find and settle on the open tube ends and begin to etch back the tube. The reduction period should be long enough for the catalyst particles to find and begin to etch back the nanotubes, but not so long as to substantially etch away the tubes. By changing to the above-described growth conditions, the etch-back process is reversed. At this point, the catalyst particles are optimally located with respect to the tube ends since they already were catalytically active at those sites (albeit in the reverse process).

The catalyst can also be supplied in the form of catalyst precursors which convert to active form under growth conditions such as oxides, other salts or ligand stabilized metal complexes. As an example, transition metal complexes with alkylamines (primary, secondary or tertiary) can be employed. Similar alkylamine complexes of transition metal oxides also can be employed. The catalyst can also be added to the free ends by causing migration of metal atoms derived from side wall pendant groups added as described above.

Figure 16:
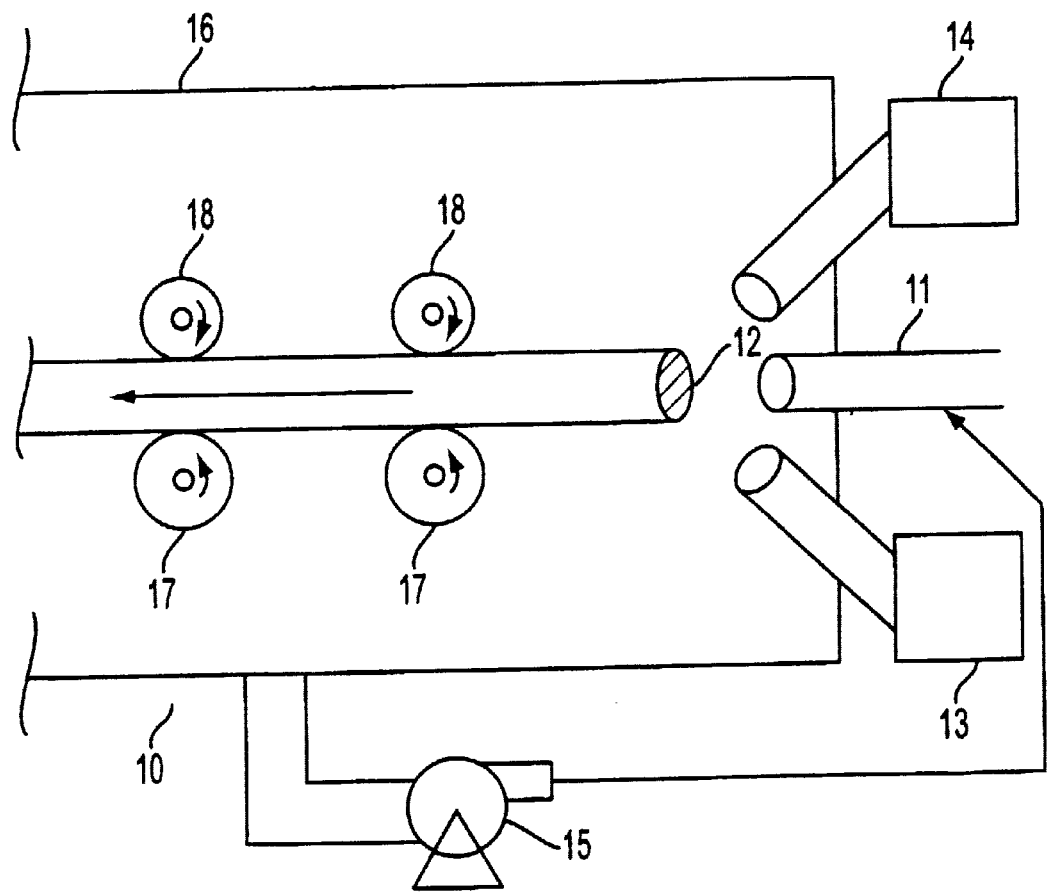
FIG. 16 is a schematic representation of the growth chamber of the fiber apparatus according to the present invention.
Figure 17:
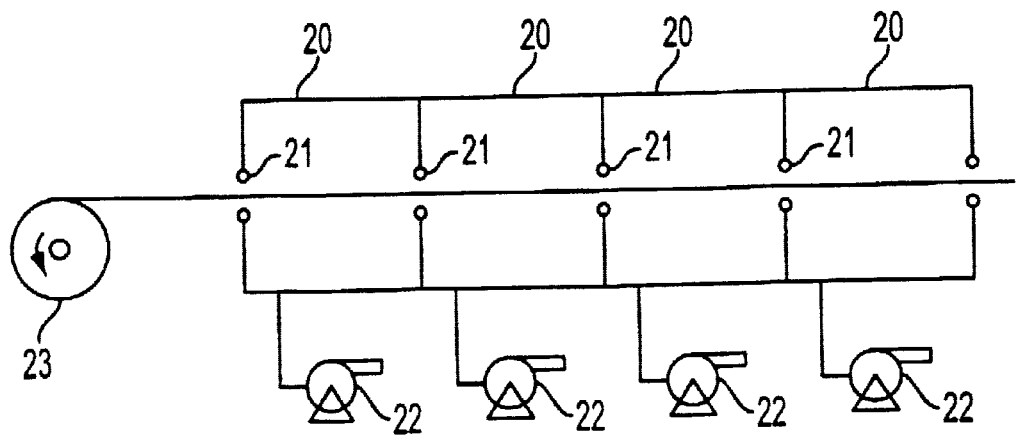
FIG. 17 is a schematic representation of the pressure equalization and collection zone of the fiber apparatus according to the present invention.

In the next step of the process of the present invention, the SWNT molecular array with catalyst deposited on the open tube ends is subjected to tube growth (extension) conditions. This may be in the same apparatus in which the catalyst is deposited or a different apparatus. The apparatus for carrying out this process will require, at a minimum, a source of carbon-containing feedstock and a means for maintaining the growing end of the continuous fiber at a growth and annealing temperature where carbon from the vapor can be added to the growing ends of the individual nanotubes under the direction of the transition metal catalyst. Typically, the apparatus will also have means for continuously collecting the carbon fiber. The process will be described for illustration purposes with reference to the apparatus shown in FIGS. 16 and 17.

The carbon supply necessary to grow the SWNT molecular array into a continuous fiber is supplied to the reactor 10, in gaseous form through inlet 11. The gas stream should be directed towards the front surface of the growing array 12. The gaseous carbon-containing feedstock can be any hydrocarbon or mixture of hydrocarbons including alkyls, acyls, aryls, aralkyls and the like, as defined above. Preferred are hydrocarbons having from about 1 to 7 carbon atoms. Particularly preferred are methane, ethane, ethylene, actylene, acetone, propane, propylene and the like. Most preferred is ethylene. Carbon monoxide may also be used and in some reactions is preferred. Use of CO feedstock with transition metal catalysts is believed to follow a different reaction mechanism than that proposed for most other feedstock gasses. See Dai, et al., 1996.

The feedstock concentration is preferably as chosen to maximize the rate of reaction, with higher concentrations of hydrocarbon giving faster growth rates. In general, the partial pressure of the feedstock material (e.g., ethylene) can be in the 0.001 to 1000.0 Torr range, with values in the range of about 1.0 to 10 Torr being preferred. The growth rate is also a function of the temperature of the growing array tip as described below, and as a result growth temperatures and feed stock concentration can be balanced to provide the desired growth rates. A preferred feedstock in many instances is CO, in which case the optimal pressures are in the range of 10 to 100 atmospheres.

It is not necessary or preferred to preheat the carbon feedstock gas, since unwanted pyrolysis at the reactor walls can be minimized thereby. The only heat supplied for the growth reaction should be focused at the growing tip of the fiber 12. The rest of the fiber and the reaction apparatus can be kept at room temperature. Heat can be supplied in a localized fashion by any suitable means. For small fibers (<1 mm in diameter), a laser 13 focused at the growing end is preferred (e.g., a C-W laser such as an argon ion laser beam at 514 nm). For larger fibers, heat can be supplied by microwave energy or R-F energy, again localized at the growing fiber tip. Any other form of concentrated electromagnetic energy that can be focused on the growing tip can be employed (e.g., solar energy). Care should be taken, however, to avoid electromagnetic radiation that will be absorbed to any appreciable extent by the feedstock gas.

The SWNT molecular array tip should be heated to a temperature sufficient to cause growth and efficient annealing of defects in the growing fiber, thus forming a growth and annealing zone at the tip. In general, the upper limit of this temperature is governed by the need to avoid pyrolysis of the feedstock and fouling of the reactor or evaporation of the deposited metal catalyst. For most feedstocks and catalysts, this is below about 1300° C. The lower end of the acceptable temperature range is typically about 500° C., depending on the feedstock and catalyst efficiency. Preferred are temperatures in the range of about 500° C. to about 1200° C. More preferred are temperatures in the range of from about 700° C. to about 1200° C. Temperatures in the range of about 900° C. to about 1100° C. are the most preferred, since at these temperatures the best annealing of defects occurs. The temperature at the growing end of the cable is preferably monitored by, and controlled in response to, an optical pyrometer 14, which measures the incandescence produced. While not preferred due to potential fouling problems, it is possible under some circumstances to employ an inert sweep gas such as argon or helium.

In general, pressure in the growth chamber can be in the range of 1 millitorr to about 1 atmosphere. The total pressure should be kept at 1 to 2 times the partial pressure of the carbon feedstock. A vacuum pump 15 may be provided as shown. It may be desirable to recycle the feedstock mixture to the growth chamber. As the fiber grows it can be withdrawn from the growth chamber 16 by a suitable transport mechanism such as drive roll 17 and idler roll 18. The growth chamber 16 is in direct communication with a vacuum feed lock zone 19.

The pressure in the growth chamber can be brought to atmospheric, if necessary, in the vacuum feed lock by using a series of chambers 20. Each of these chambers is separated by a loose TEFLON O-ring seal 21 surrounding the moving fiber. Pumps 22 effect the differential pressure equalization. A take-up roll 23 continuously collects the room temperature carbon fiber cable. Product output of this process can be in the range of $10^{-3}$ to $10^1$ feet per minute or more. By this process, it is possible to produce tons per day of continuous carbon fiber made up of SWNT molecules.

Growth of the fiber can be terminated at any stage (either to facilitate manufacture of a fiber of a particular length or when too many defects occur). To restart growth, the end may be cleaned (i.e., reopened) by oxidative etching (chemically or electrochemically). The catalyst particles can then be reformed on the open tube ends, and growth continued.

The molecular array (template) may be removed from the fiber before or after growth by macroscopic physical separation means, for example by cutting the fiber with scissors to the desired length. Any section from the fiber may be used as the template to initiate production of similar fibers.

Figure 18:
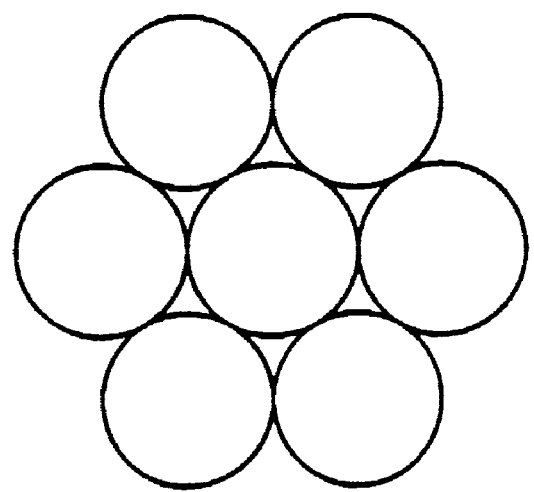
FIG. 18 is a composite array according to the present invention.
Figure 19:
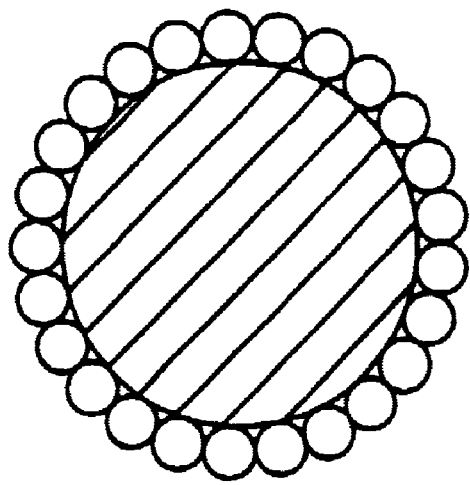
FIG. 19 is a composite array according to the present invention.

The continuous carbon fiber of the present invention can also be grown from more than one separately prepared molecular array or template. The multiple arrays can be the same or different with respect to the SWNT type or geometric arrangement in the array. Large cable-like structures with enhanced tensile properties can be grown from a number of smaller separate arrays as shown in FIG. 18. In addition to the masking and coating techniques described above, it is possible to prepare a composite structure, for example, by surrounding a central core array of metallic SWNTs with a series of smaller circular non-metallic SWNT arrays arranged in a ring around the core array as shown in FIG. 19.

Not all the structures contemplated by this invention need be round or even symmetrical in two-dimensional cross section. It is even possible to align multiple molecular array seed templates in a manner as to induce nonparallel growth of SWNTs in some portions of the composite fiber, thus producing a twisted, helical rope, for example. It is also possible to catalytically grow macroscopic carbon fiber in the presence of an electric field to aid in alignment of the SWNTs in the fibers, as described above in connection with the formation of template arrays.

Random Growth of Carbon Fibers From SWNTs

While the continuous growth of ordered bundles of SWNTs described above is desirable for many applications, it is also possible to produce useful compositions comprising a randomly oriented mass of SWNTS, which can include individual tubes, ropes and/or cables. The random growth process has the ability to produce large quantities, i.e., tons per day, of SWNT material.

In general the random growth method comprises providing a plurality of SWNT seed molecules that are supplied with a suitable transition metal catalyst as described above, including the use of side wall derivatization to supply the catalyst moiety and subjecting the seed molecules to SWNT growth conditions that result in elongation of the seed molecule by several orders of magnitude, eg., $10^2$ to $10^{10}$ or more times its original length.

The seed SWNT molecules can be produced as described above, preferably in relatively short lengths, (e.g., by cutting a continuous fiber or purified bucky paper. In a preferred embodiment, the seed molecules can be obtained after one initial run from the SWNT felt produced by this random growth process (e.g., by cutting). The lengths do not need to be uniform and generally can range from about 5nm to 10 $\mu$m in length.

These SWNT seed molecules may be formed on macroscale or nanoscale supports that do not participate in the growth reaction. In another embodiment, SWNTs or SWNT structures can be employed as the support material/seed. For example, the self assembling techniques described below can be used to form a three-dimensional SWNT nanostructure. Nanoscale powders produced by these techniques have the advantage that the support material can participate in the random growth process.

The supported or unsupported SWNT seed materials can be combined with a suitable growth catalyst as described above, by opening SWNT molecule ends and depositing a metal atom cluster. Alternatively, the growth catalyst can be provided to the open end or ends of the seed molecules by evaporating a suspension of the seeds in a suitable liquid containing a soluble or suspended catalyst precursor. For example, when the liquid is water, soluble metal salts such as $Fe(NO_3)_3$, $Ni(NO_3)_2$ or $CO(NO_3)_2$ and the like may be employed as catalyst precursors. In order to insure that the catalyst material is properly positioned on the open end(s) of the SWNT seed molecules, it may be necessary in some circumstances to derivatize the SWNT ends with a moiety that binds the catalyst nanoparticle or more preferably a ligand-stabilized catalyst nanoparticle.

In the first step of the random growth process the suspension of seed particles containing attached catalysts or associated with dissolved catalyst precursors is injected into an evaporation zone where the mixture contacts a sweep gas flow and is heated to a temperature in the range of 250–500° C. to flash evaporate the liquid and provide an entrained reactive nanoparticle (i.e., seed/catalyst). Optionally this entrained particle stream is subjected to a reduction step to further activate the catalyst (e.g., heating from 300–500° C. in $H_2$). A carbonaceous feedstock gas, of the type employed in the continuous growth method described above, is then introduced into the sweep gas/active nanoparticle stream and the mixture is carried by the sweep gas into and through a growth zone.

The reaction conditions for the growth zone are as described above, i.e., 500–100° C. and a total pressure of about one atmosphere. The partial pressure of the feedstock gas (e.g., ethylene, CO) can be in the range of about 1 to 100 Torr for ethylene or 1 to 100 atmospheres for CO. The reaction with pure carbon or hydrocarbon feedstocks is preferably carried out in a tubular reactor through which a sweep gas (e.g., argon) flows.

The growth zone may be maintained at the appropriate growth temperature by 1) preheating the feedstock gas, 2) preheating the sweep gas, 3) externally heating the growth zone, 4) applying localized heating in the growth zone, e.g., by laser or induction coil, or any combination of the foregoing.

Downstream recovery of the product produced by this process can be effected by known means such as filtration, centrifugation and the like. Purification may be accomplished as described above. Felts made by this random growth process can be used to make composites, e.g., with polymers, epoxies, metals, carbon (i.e., carbon/carbon materials) and high $-T_c$ superconductors for flux pinning.

What is claimed is:

1. A method for derivatizing a single wall carbon nanotube comprising the step of covalently bonding substituents to carbon atoms on a sidewall of the single wall carbon nanotube.

2. The method of claim 1, wherein the substituents are selected from the group consisting of alkyl, acyl, aryl, aralkyl, halogen, substituted thiol, unsubstituted thiol, substituted amino, unsubstituted amino, hydroxy, and OR', wherein R' is selected from the group consisting of hydrogen, alkyl, acyl, aryl, aralkyl, halogen, substituted thiol, unsubstituted thiol, substituted amino, unsubstituted amino, a linear carbon chain, and a cyclic carbon chain.

3. The method of claim 2, wherein the linear carbon chain or the cyclic carbon chain or both is substituted with at least one heteroatom.

4. The method of claim 2, wherein the linear carbon chain or the cyclic carbon chain or both is substituted with one or more of the group consisting of =O, =S, hydroxy, an aminoalkyl, an amino acid, and a peptide of 2–8 amino acids.

5. The method of claim 1, wherein the substituents are selected from the group consisting of alkyls and phenyls.

6. The method of claim 1, further comprising the step of complexing a metal to at least one of the substituents.

7. The method of claim 6, wherein the metal is selected from the group consisting of Group VI B metals and Group VIII B metals.

8. The method of claim 1, wherein the amount of substituent bonded to carbon atoms of the single wall carbon nanotube is at a substituent to carbon ratio of from (a) one substituent to about 26 carbon atoms to (b) one substituent to about two carbon atoms.

9. The method of claim 8, wherein the amount of substituent bonded to the carbon atoms of the single wall carbon nanotube is at the substituent to carbon ratio of from (a) one substituent to about ten carbon atoms to (b) one substituent to about two carbon atoms.

10. The method of claim 9, wherein the amount of substituent bonded to the carbon atoms of the single wall carbon nanotube is at a substituent to carbon ratio of from (a) one substituent to about three carbon atoms to (b) one substituent to about two carbon atoms.

11. A method for derivatizing a sidewall of a single wall carbon nanotube comprising:
   (i) fluorinating a single wall carbon nanotube; and
   (ii) reacting the fluorinated single wall carbon nanotube with a compound containing a substituent to covalently bond the substituents to the single wall carbon nanotube.

12. The method of claim 11, wherein the substituents are selected from the group consisting of alkyl, acyl, aryl, aralkyl, halogen, substituted thiol, unsubstituted thiol, substituted amino, unsubstituted amino, hydroxy, and OR', wherein R' is selected from the group consisting of hydrogen, alkyl, acyl, aryl, aralkyl, halogen, substituted thiol, unsubstituted thiol, substituted amino, unsubstituted amino, a linear carbon chain, and a cyclic carbon chain.

13. The method of claim 12, wherein the linear carbon chain or the cyclic carbon chain or both is substituted with at least one heteroatom.

14. The method of claim 12, wherein the linear carbon chain or the cyclic carbon chain or both is substituted with one or more of the group consisting of =O, =S, hydroxy, an aminoalkyl, an amino acid, and a peptide of 2–8 amino acids.

15. The method of claim 11, wherein the substituents selected from the group consisting of alkyls and phenyls.

16. The method of claim 11, further comprising the step of complexing a metal to at least one of the substituents.

17. The method of claim 16, wherein the metal is selected from the group consisting of Group VI B metals and Group VIII B metals.

18. The method of claim 11, wherein the amount of substituent bonded to carbon atoms of the single wall carbon nanotube is at a substituent to carbon ratio of from (a) one substituent to about 26 carbon atoms to (b) one substituent to about two carbon atoms.

19. The method of claim 18, wherein the amount of substituent bonded to the carbon atoms of the single wall carbon nanotube is at the substituent to carbon ratio of from (a) one substituent to about ten carbon atoms to (b) one substituent to about two carbon atoms.

20. The method of claim 19, wherein the amount of substituent bonded to the carbon atoms of the single wall carbon nanotube is at the substituent to carbon ratio of from (a) one substituent to about three carbon atoms to (b) one substituent to about two carbon atoms.

21. A method for preparing single wall carbon nanotubes having substituents attached to the sidewall of the nanotube comprising:
   (i) reacting the single wall carbon nanotubes with a fluorinating agent;
   (ii) reacting the fluorine derivatized single wall carbon nanotubes with a compound containing a substituent; and
   (iii) recovering the single wall carbon nanotubes with substituents covalently bonded to carbon atoms of the sidewall of the single wall carbon nanotubes.

22. The method of claim 21, wherein the substituents are selected from the group consisting of alkyl, acyl, aryl, aralkyl, halogen, substituted thiol, unsubstituted thiol, substituted amino, unsubstituted amino, hydroxy, and OR', wherein R' is selected from the group consisting of hydrogen, alkyl, acyl, aryl, aralkyl, halogen, substituted thiol, unsubstituted thiol, substituted amino, unsubstituted amino, a linear carbon chain, and a cyclic carbon chain.

23. The method of claim 22, wherein the linear carbon chain or the cyclic carbon chain or both is substituted with at least one heteroatom.

24. The method of 22, wherein the linear carbon chain or the cyclic carbon chain or both is substituted with one or more of the group consisting of =O, =S, hydroxy, an aminoalkyl, an amino acid, and a peptide of 2–8 amino acids.

25. The method of claim 21, wherein the fluorinating agent is selected from the group consisting of fluorine, $XeF_2$, $XeF_4$, $ClF_3$, $BrF_3$, $TF_5$, $AgF_2$, and $MnF_3$.

26. The method of claim 21, wherein the substituents are part of an organometallic compound before being covalently bonded to the sidewall of the single wall carbon nanotube.

27. The method of claim 21, wherein said organometallic compound is a compound of an alkali metal, said compound having from 1 to 20 carbon atoms and said compound being selected from the group consisting of a substituted alkyl compound of the alkali metal, an unsubstituted alkyl of the alkali metal, a substituted aryl compound of the alkali metal, and an unsubstituted aryl compound of the alkali metal.

28. The method of claim 27, wherein the alkali metal is sodium or lithium.

29. The method of claim 28, further comprising removing residual fluorine from the single wall carbon nanotube subsequent to bonding the substituent to the single wall carbon nanotube.

30. A method for preparing carbon nanotubes having substituents attached to the sidewall of the nanotube comprising:

i) reacting the carbon nanotubes with a fluorinating agent;

ii) recovering the fluorine derivatized carbon nanotubes;

iii) reacting the fluorine derivatized carbon nanotubes with a compound containing a substituent; and iv) recovering the carbon nanotubes with substituents covalently bonded to carbon atoms of the sidewall of the carbon nanotubes.

31. The method of claim 30, wherein the substituents are selected from the group consisting of alkyl, acyl, aryl, aralkyl, halogen, substituted thiol, unsubstituted thiol, substituted amino, unsubstituted amino, hydroxy, and OR', wherein R' is selected from the group consisting of hydrogen, alkyl, acyl, aryl, aralkyl, halogen, substituted thiol, unsubstituted thiol, substituted amino, unsubstituted amino, a linear carbon chain, and a cyclic carbon chain.

32. The method of claim 31, wherein the linear carbon chain or the cyclic carbon chain or both is substituted with at least one heteroatom.

33. The method of claim 31, wherein the linear carbon chain or the cyclic carbon chain or both is substituted with one or more of the group consisting of =O, =S, hydroxy, an aminoalkyl, an amino acid, and a peptide of 2–8 amino acids.

34. The method of claim 30, wherein the fluorinating agent is selected from the group consisting of fluorine, $XeF_2$, $XeF_4$, $ClF_3$, $BrF_3$, $IF_5$, $AgF_2$, and $MnF_3$.

35. The method of claim 30, wherein the substituents are part of an organometallic compound before being covalently bonded to the sidewall of the carbon nanotube.

36. The method of claim 30, wherein said organometallic compound is a compound of an alkali metal, said compound having from 1 to 20 carbon atoms and said compound being selected from the group consisting of a substituted alkyl compound of the alkali metal, an unsubstituted alkyl of the alkali metal, a substituted aryl compound of the alkali metal, and an unsubstituted aryl compound of the alkali metal.

37. The method of claim 36, wherein the alkali metal is sodium or lithium.

38. The method of claim 30, further comprising removing residual fluorine from the carbon nanotube subsequent to bonding the substituent to the carbon nanotube.

39. A method for derivatizing sidewalls of single wall carbon nanotubes comprising the steps of:

(i) reacting the single wall carbon nanotubes with a fluorinating agent;

(ii) solvating the single wall carbon nanotubes; and (iii) reacting the single wall carbon nanotubes with a compound containing a substituent to covalently bond the substituents to the single wall carbon.

40. The method of claim 39, wherein the substituents are selected from the group consisting of alkyl, acyl, aryl, aralkyl, halogen, substituted thiol, unsubstituted thiol, substituted amino, unsubstituted amino, hydroxy, and OR', wherein R' is selected from the group consisting of hydrogen, alkyl, acyl, aryl, aralkyl, halogen, substituted thiol, unsubstituted thiol, substituted amino, unsubstituted amino, a linear carbon chain, and a cyclic carbon chain.

41. The method of claim 40, wherein the linear carbon chain or the cyclic carbon chain or both is substituted with at least one heteroatom.

42. The method of claim 40, wherein the linear carbon chain or the cyclic carbon chain or both is substituted with one or more of the group consisting of =O, =S, hydroxy, an aminoalkyl, an amino acid, and a peptide of 2–8 amino acids.

43. The method of claim 39, wherein the fluorinating agent is selected from the group consisting of fluorine, $ClF_3$, $BrF_3$, $IF_5$, $XeF_2$, $XeF_4$, $AgF_2$, and $MnE_3$.

44. The method of claim 39, wherein the solvation step comprises sonication.

45. The method of claim 39, wherein the solvation step comprises using a solvent selected from the group consisting of an alcohol, $CHCl_3$, and dimethylformamide.

46. The method of claim 45, wherein the alcohol is selected from the group consisting of methanol, ethanol, 2,2,2-trifluoroethanol, 2-propanol, 2-butanol, n-pentanol, n-hexanol, cyclohexanol and n-heptanol.

47. The method of claim 39, wherein the amount of substituent bonded to carbon atoms of the single wall carbon nanotubes is at a substituent to carbon ratio of from (a) one substituent to about 26 carbon atoms to (b) one substituent to about two carbon atoms.

48. The method of claim 47, wherein the amount of substituent bonded to the carbon atoms of the single wall carbon nanotubes is at the substituent to carbon ratio of from (a) one substituent to about ten carbon atoms to (b) one substituent to about two carbon atoms.

49. The method of claim 48, wherein the amount of substituent bonded to the carbon atoms of the single wall carbon nanotubes is at a substituent to carbon ratio of from (a) one substituent to about three carbon atoms to (b) one substituent to about two carbon atoms.

* * * * *